US006870734B2

(12) United States Patent
Mertesdorf et al.

(10) Patent No.: US 6,870,734 B2
(45) Date of Patent: Mar. 22, 2005

(54) FIBER CONTAINMENT SYSTEM

(75) Inventors: Daniel Ray Mertesdorf, Nicollet, MN (US); Clinton M. Knudsen, St. Louis Park, MN (US); Michael J. Follingstad, Edina, MN (US); David Anthony Durand, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 31 days.

(21) Appl. No.: 10/449,868

(22) Filed: May 30, 2003

(65) Prior Publication Data

US 2004/0251220 A1 Dec. 16, 2004

(51) Int. Cl.[7] ................................................. G06F 1/16
(52) U.S. Cl. ....................... 361/684; 361/685; 385/135; 312/223.2
(58) Field of Search .................................. 361/683–687, 361/724–730, 737; 439/928.1, 928, 929; 385/134–135; 211/41.17, 26.2; 312/223.1–223.2

(56) References Cited

U.S. PATENT DOCUMENTS

| 4,708,430 | A |   | 11/1987 | Donaldson et al. | 385/134 |
|---|---|---|---|---|---|
| 4,792,203 | A |   | 12/1988 | Nelson et al. | 385/130 |
| 5,946,440 | A | * | 8/1999 | Puetz | 385/135 |
| 6,263,141 | B1 | * | 7/2001 | Smith | 385/135 |
| 6,301,424 | B1 |   | 10/2001 | Hwang | 385/130 |
| 6,442,022 | B1 | * | 8/2002 | Paul | 361/685 |
| 6,560,099 | B1 | * | 5/2003 | Chang | 361/685 |

FOREIGN PATENT DOCUMENTS

| DE | 43 29 184 A1 | 3/1995 |
|---|---|---|
| DE | 44 13 136 C1 | 5/1995 |
| WO | WO 02/071767 A2 | 9/2000 |

OTHER PUBLICATIONS

ADC Telecommunications, Inc., FL2000 Products Catalog, Literature No. 803, front cover, table of contents, pp. 1–32, rear cover (Dec. 2000).
ADC Telecommunications, Inc., Next Generation Frame Product Family Ordering Guide, Literature No. 820, front cover, table of contents, pp. 1–43, rear cover (Apr. 2002).
Copending U.S. Appl. No. 10/277,606, filed Oct. 21, 2003, entitled "High Density Panel With Rotating Tray," 15 pages of specification and 22 drawings.

* cited by examiner

Primary Examiner—Hung Van Duong
(74) Attorney, Agent, or Firm—Merchant & Gould PC

(57) ABSTRACT

The present invention relates to a telecommunications termination panel with a housing including a front opening and a rear opening. Pivotably mounted within the housing is a tray within the front opening, pivoting about a vertical axis located adjacent a first side of the housing. A cable path is defined along a bottom of the housing along the first side between the cable entry of the tray and the rear opening. A movable plate is positioned adjacent the first side and is movable between a first position defining an upper limit of the cable path when the tray is closed and a second position allowing access to the cable path when the tray is open. The movement of the plate between the first and second positions is actuated by the movement of the tray between the closed and open positions. The present invention further relates to a telecommunications termination panel with a housing including a front opening. Pivotably mounted within the housing is a tray within the front opening, pivoting about a vertical axis located adjacent a first side of the housing. The tray is pivotable between an open position and a closed position. The tray includes a cover which can be moved between an operational position and an access position when the tray is in the open position. With the cover in the operational position, the tray is prevented from moving from the open position to the closed position.

22 Claims, 52 Drawing Sheets

US 6,870,734 B2

FIBER CONTAINMENT SYSTEM

TECHNICAL FIELD

The present invention relates generally to telecommunications termination panels with pivoting bulkheads.

BACKGROUND

In telecommunications infrastructure installations, equipment for switching, cross-connecting and inter-connecting a variety of panels is used. Many of these panels are installed in telecommunications equipment racks to permit organized, high-density installations to be achieved in limited space available for equipment. Due to the increasing demand for telecommunications system capacity, it is desirable to increase the density of connections within a given space that can be achieved. Commensurate with the demand for increased capacity from the same installation footprint is a desire to improve the organization and handling of the cables used to link the equipment within the installation and the outside plant and facilities cables.

One approach to increasing the density of connections within the same footprint is to increase the number of connections supported within a given panel. Access to these connections within panels of higher densities is necessary for the installation, operation and maintenance of the panels. Preferably, access to any one connection within a panel will not cause unnecessary strain on cables extending from other adjacent connections. Modification of the layout of the interior of these panels to improve connector access is desirable.

In commonly assigned and related application Ser. No. 10/277,606, filed on Oct. 21, 2002, a panel with a variety of improvements to the density of connections within the panel and access thereto was described. The disclosure of this application is incorporated herein by reference. Additional improvements to the panels of this earlier application are desirable.

SUMMARY OF THE INVENTION

The present invention relates to a telecommunications termination panel with a housing including a front opening and a rear opening. Pivotably mounted within the housing is a tray within the front opening, pivoting about a vertical axis located adjacent a first side of the housing. The tray includes a cable entry adjacent the axis of pivot and a plurality of connection locations and is movable between an open position and a closed position. The rear opening is adjacent the first side of the housing and a cable path is defined along a bottom of the housing along the first side between the cable entry of the tray and the rear opening. A movable plate is positioned adjacent the first side and is movable between a first position when the tray is closed and a second position when the tray is open. The movement of the plate between the first and second positions is actuated by the movement of the tray between the closed and open positions. The movable plate in the first position defines an upper limit to the cable path beneath the tray and the movable plate in the second position is raised above the cable path to permit placement of cables within the cable path.

The present invention further relates to a telecommunications termination panel with a housing including a front opening and a tray pivotably mounted within the front opening. The tray pivots about a vertical axis located adjacent the first side and including a cable entry adjacent the axis of pivot and a plurality of connection locations. The tray is movable between an open position and a closed position. The tray includes perimeter and a wall extending upward adjacent the perimeter to enclose the plurality of connector locations. A first portion of the wall closes the front opening of the housing when the tray is in the closed position, and a cover is hingedly mounted to a second portion of the wall opposite the first portion. The cover is movable between an access position and an operational position when the tray is in the open position. The operational position of the cover allows the tray to move from the open position to the closed position and also allows a user access to the connection locations and to cables extending to or away from the connection locations. When the cover is in the access position, the tray is prevented from moving from the open to the closed position.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows.

DETAILED DESCRIPTION OF THE PREFERRED EMBODIMENT

Reference will now be made in detail to the exemplary aspects of the present invention that are illustrated in the accompanying drawings. Wherever possible, the same reference numbers will be used throughout the drawings to refer to the same or like parts.

Figure 1:
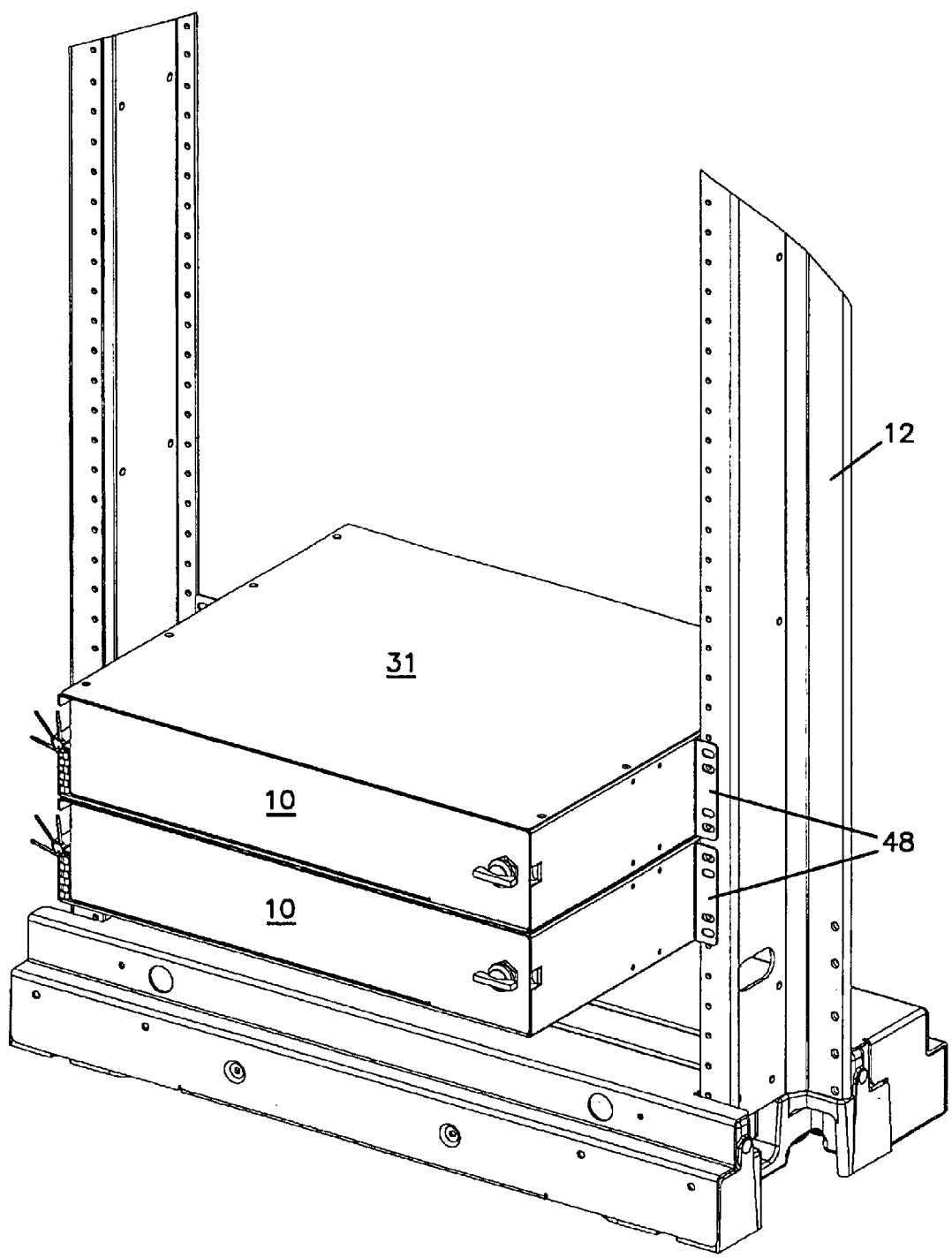
FIG. 1 is a perspective view of a telecommunications equipment rack with two termination panels according to the present invention mounted.

Referring now to the FIGS., telecommunications connections panels 10 provide a plurality of connection locations for linking telecommunications cables within a single panel. These panels 10 may electrically connect copper cables or optically connect optical fiber cables at these connection locations. Such a panel 10 is shown in FIG. 1, mounted to a telecommunications equipment rack 12 adjacent a second panel 10. Additional panels 10 or other telecommunications equipment may also be mounted to rack 12. Rack 12 is shown as a nineteen inch wide rack. It is anticipated that panel 10 could also be adapted for use with a twenty-three inch wide rack or with other widths of racks within the scope of the present invention.

Figure 2:
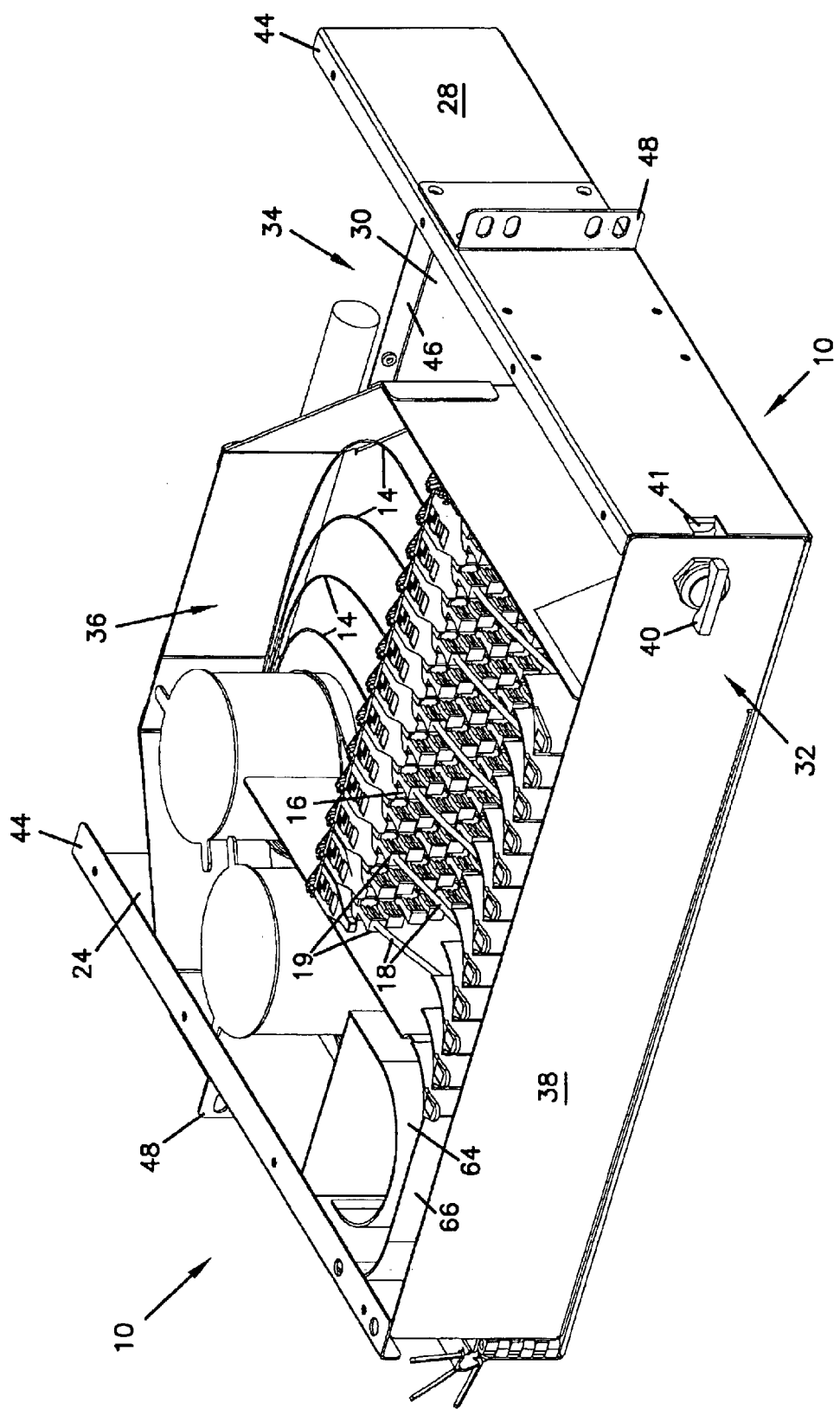
FIG. 2 is a front perspective view of a first embodiment of a termination panel according to the present invention with the top removed for clarity.
Figure 4:
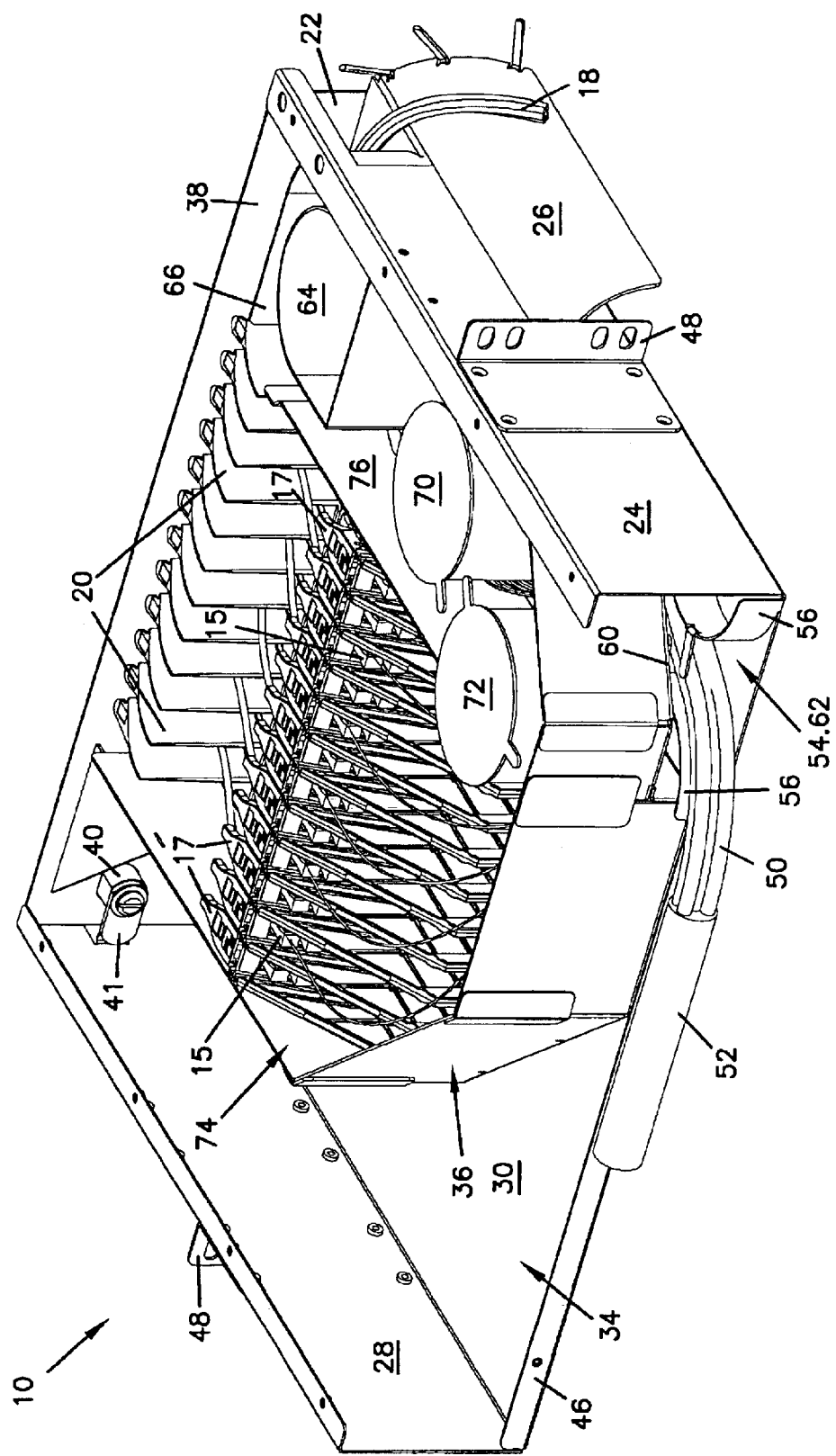
FIG. 4 is a rear perspective view of the termination panel of FIG. 2.

Referring now to FIG. 4, a plurality of optical fiber cables 14 are each terminated by a connector 15. These connectors 15 are connected to a first side or rear of a plurality of connection locations or adapters 16. A plurality of optical fiber patch cords, such as cables 18 are each terminated with a connector 19. These connectors 19 are connected to a second side or front of adapters 16. Adapters 16 align and optically link the optical fiber within a cable 14 with the optical fiber within a cable 18. As seen in FIG. 2, cables 18 extend away from adapters 16, passing through a plurality of vertically oriented fingers 20 which provide bend radius protection as cables 18 are directed toward and through an opening 22 in a side 24 of panel 10. After passing through opening 22, cables 18 may be directed across a ramp 26 (also providing bend radius protection) into an adjacently mounted cableway and extended to other telecommunications equipment.

Figure 3:
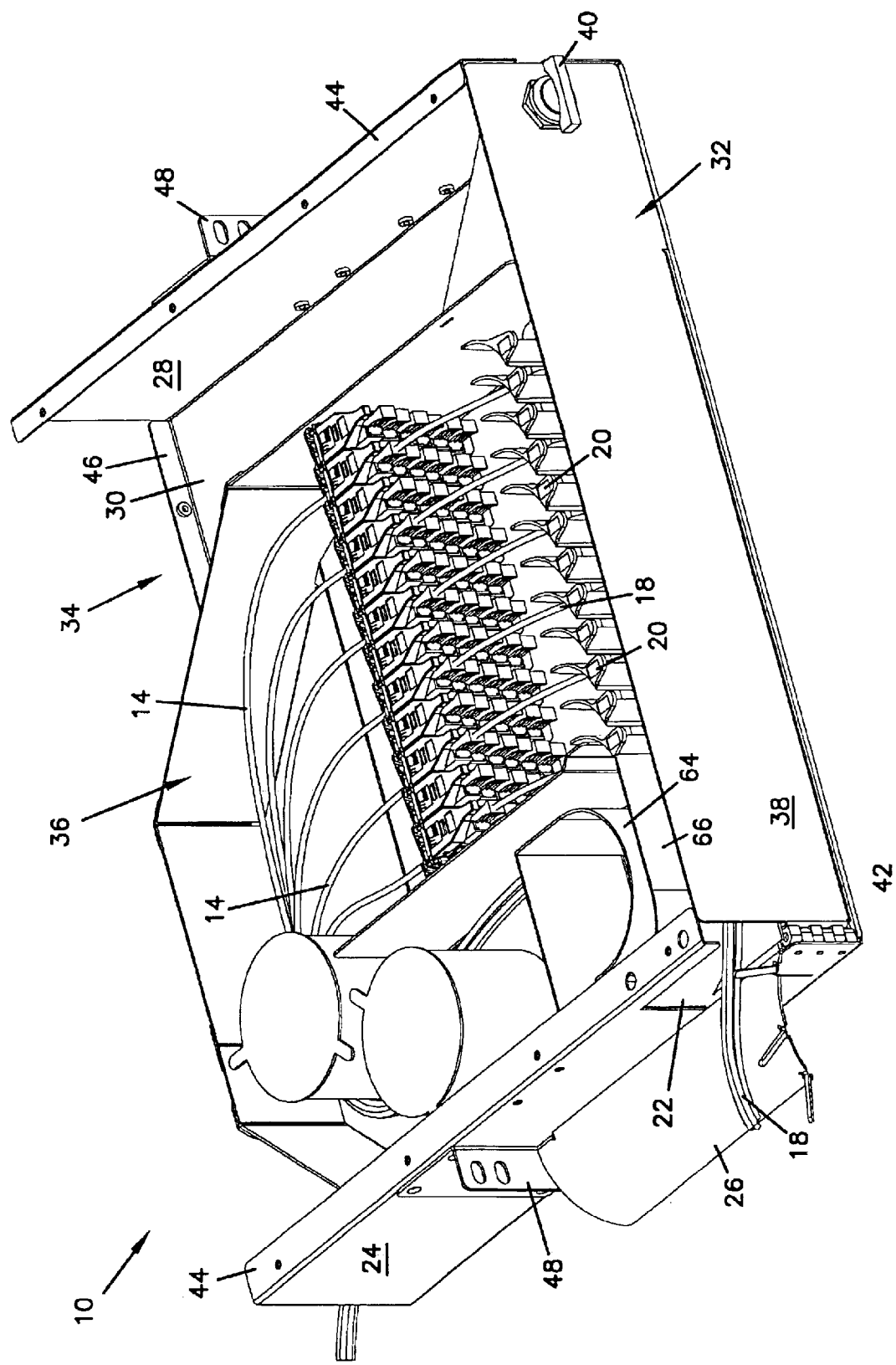
FIG. 3 is a second front perspective view of the termination panel of FIG. 2.

Referring now to FIGS. 2 and 3, panel 10 includes a housing made up of side 24, opposing side 28, and a bottom 30. A top 31 (shown in FIG. 1 and removed from the other drawings for clarity) cooperates with sides 24 and 28 and bottom 30 to define a front opening 32 and a rear opening 34. Mounted within front opening 32 is a pivoting tray 36 with a front wall 38 substantially closing off front opening 32 with tray 36 positioned as shown in FIGS. 2 through 6. Tray 36 pivots about an axis defined by a hinge 42 adjacent side 24. Front wall 38 includes a releasably latch 40 opposite hinge 42 which engages tab 41 in side 28 to releasably hold tray 36 in a closed position within front opening 32. Latch 40 as shown is a rotating finger latch. It is anticipated that latch 40 could be a lock requiring a key to release, providing additional security to the interior of panel 10.

Sides 24 and 28 include flanges 44 for mounting top 31 to panel 10. Bottom 30 includes a rear mounting flange 46 so that a rear wall (not shown) can be mounted to substantially close off rear opening 34. Sides 24 and 28 also include mounting brackets 48 along an outer side to aid in mounting panel 10 to rack 12.

Figure 5:
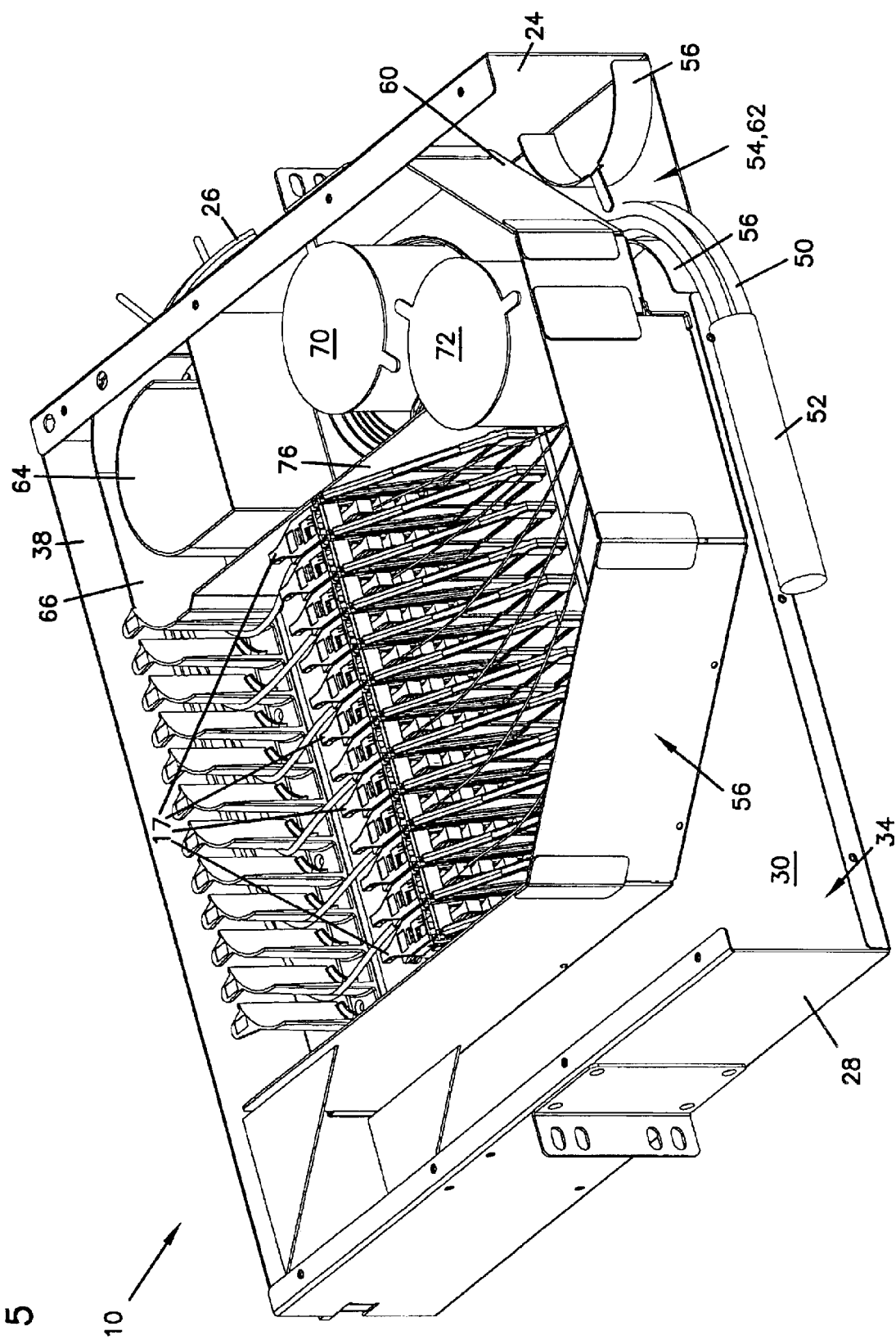
FIG. 5 is a second rear perspective view of the termination panel of FIG. 2.

Referring now to FIGS. 4 and 5, adapters 16 are mounted in a series of parallel, vertically oriented modules 17. As shown in the FIGS., six adapters are mounted in each module 17 and twelve modules 17 are mounted on tray 36. Thus configured, panel 10 is capable of supporting up to seventy-two optical connections between optical fiber cables 14 and patch cords 18. Optical fiber cables 14 enter panel 10 through rear opening 34 within a multi-strand cable such as an inter-facility cable 50. Cable 50 is held to panel 10 by a cable clamp 52 adjacent rear opening 34 and enters panel 10 through a cable access port 54. If a rear wall were mounted to panel 10 to close off rear opening 34, cable access port 54 should remain unobstructed to permit entry of cable 50. Cable 50 includes at least some of optical fibers 14 bundled together in a common casing.

Cable access port 54 includes a pair of opposing bend radius protection curves 56 to ensure that cable 50 (or any other optical fiber cables extending into panel 10 through port 54) are not bend through too tight of a curve as the cables enter port 54. Each curve 56 includes a finger 58 positioned with respect to each other to permit cable 50 to be laid between curves 56 and prevent cable 50 from extending above curves 56. Tray 36 includes a raised floor 60 which is positioned above curves 56, fingers 58 and cable 50. Raised floor 60 cooperates with side 24 and bottom 30 to define a cable path 62. Cable path 62 permits cable 50 to extend through cable access port 54 and into panel 10 along bottom 30 and side 24 in the direction of hinge 42.

Figure 6:
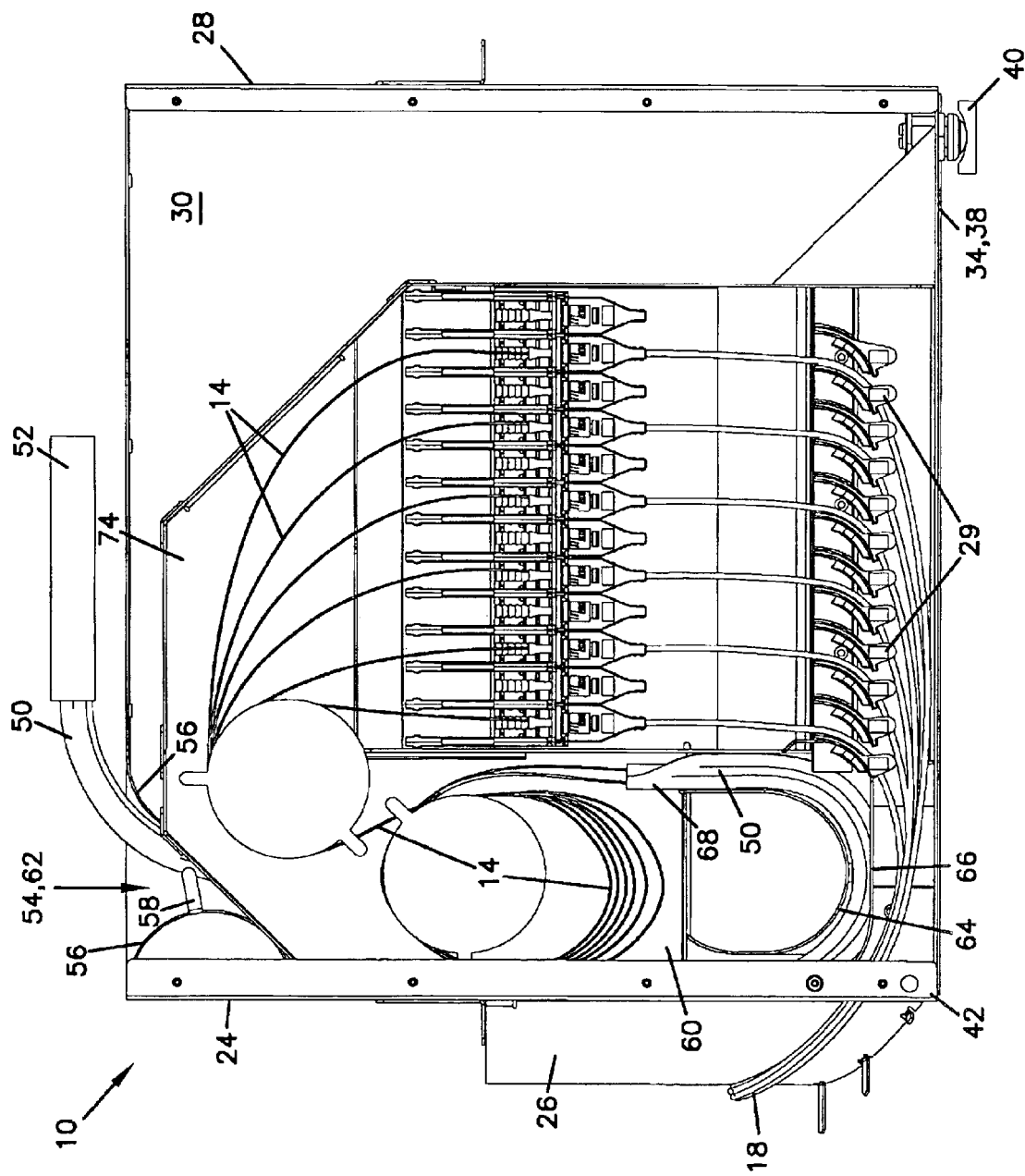
FIG. 6 is a top view of the termination panel of FIG. 2.

Referring now to FIG. 6, cable 50 extends through cable path 62 along side 24 to enter tray 36 adjacent hinge 42, extending up out of cable path 62 and entering tray 36 above raised floor 60. Cable 50 extends between an inner wall 64 and an outer wall 66. Located between walls 64 and 66 is a ramp 65 which lifts cable 50 from beneath raised floor 60 into tray 36 above raised floor 60. Walls 64 and 66 cooperate to carry cable 50 through a semicircular arc without violating bend radius rules. As cable 50 enters tray 36, it is held by an anchor 68. Cable 50 is then broken down into individual fiber cables 14. To ensure that additional slack is available to repair damage to cables 14 without having to adjust the position of cable 50, cables 14 are wrapped around a first drum 70 before extending about a second drum 72 into an area 74 behind adapters 16 within modules 17. From area 74, connectors 15 of cables 14 are connected to adapters 16 which will permit cables 14 to be optically connected to cables 18. Outer wall 66 also provides bend radius protection to cables 18 extending from fingers 20 through opening 22 in side 24 and across ramp 26.

Figure 7:
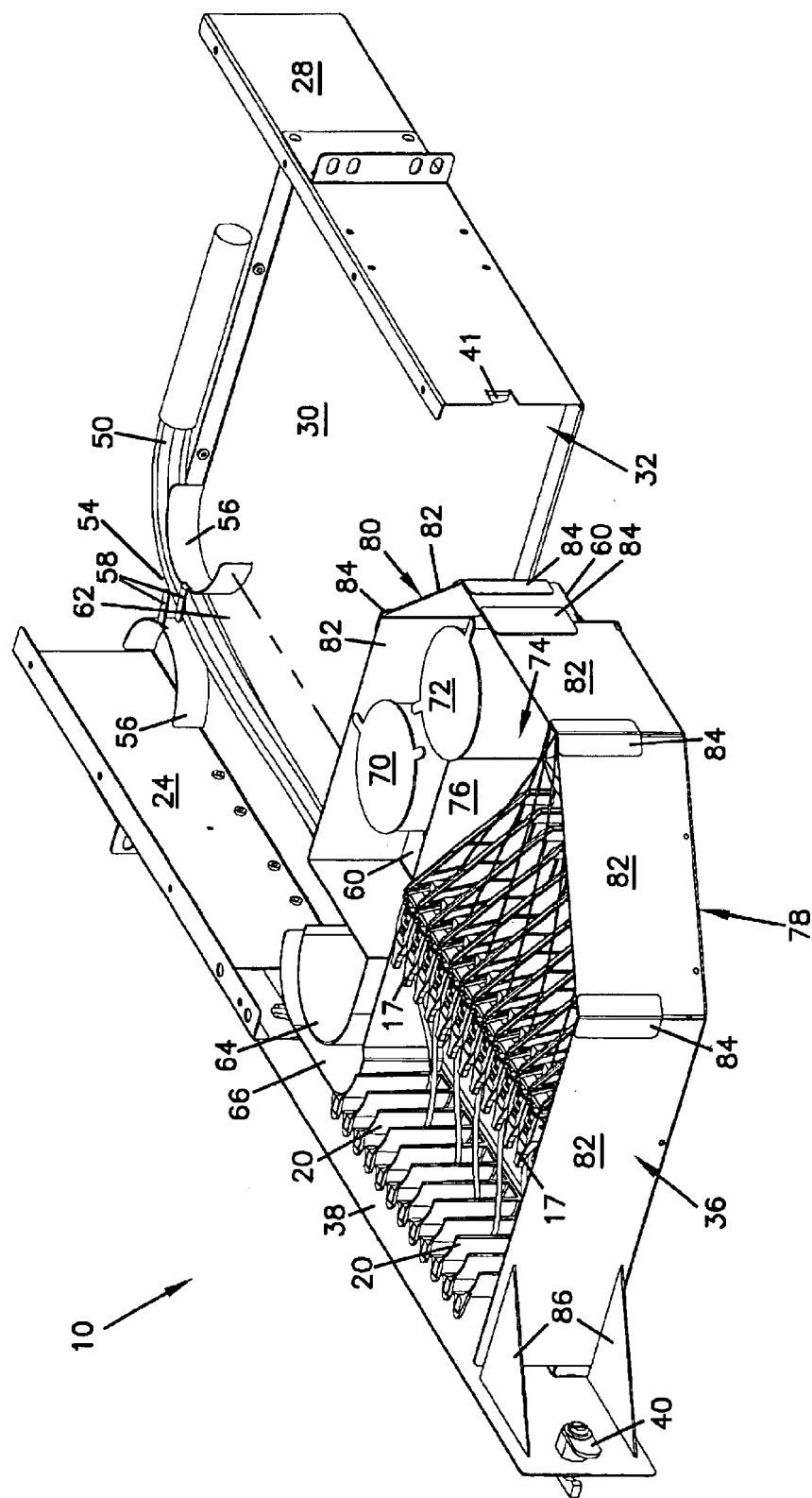
FIG. 7 is a front perspective view of the termination panel of FIG. 2, with the tray swung to an open position allowing access to the connections.
Figure 8:
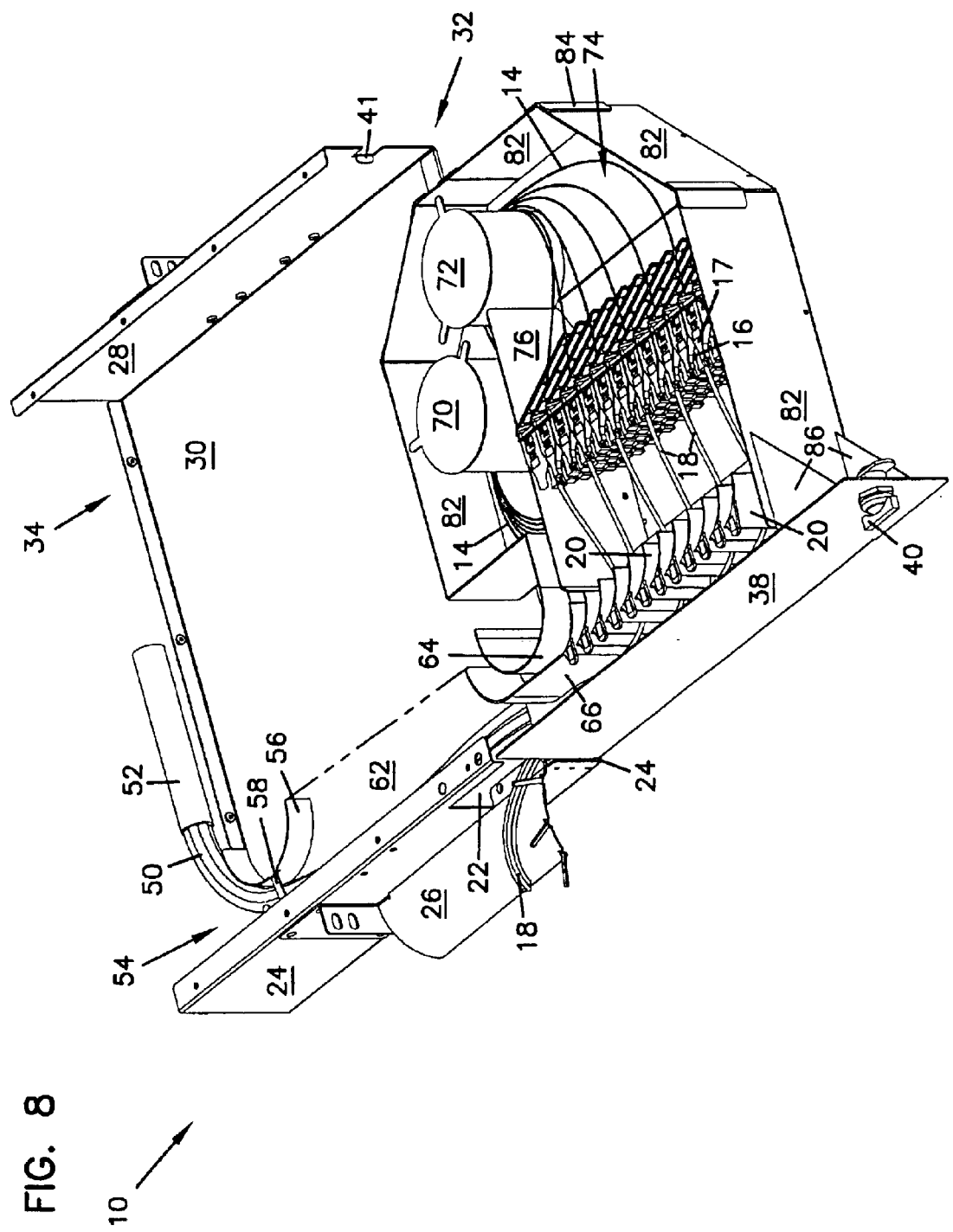
FIG. 8 is a second front perspective view of the termination panel of FIG. 7.
Figure 9:
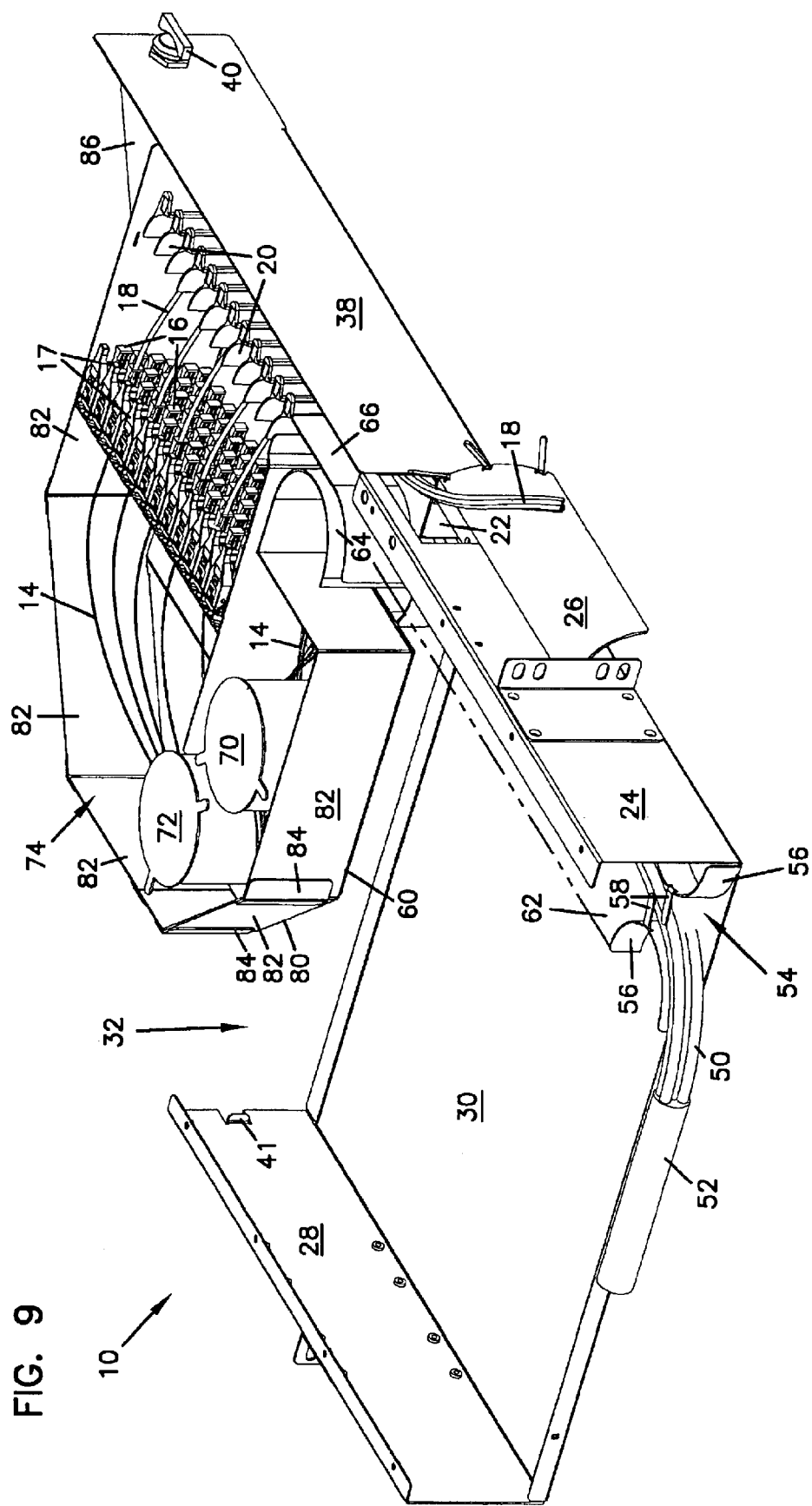
FIG. 9 is a rear perspective view of the termination panel of FIG. 7.

Referring now to FIGS. 7 through 9, a dashed line on bottom 30 indicates the location of cable path 62 along side 24. In this FIG., tray 36 is swung to an open position about hinge 42 allowing entry into panel 10 through front opening 32. Along an end of tray 36 opposite front wall 38, both corners have been relieved or angled. A first angled corner 78 allows tray 36 to pivot about hinge 42 without being impeded by side 28. A second angled corner 80 allows greater access into panel 10 through front opening 32 between tray 36 and side 28 when tray 36 is in the open position.

Tray 36 includes a plurality of bulkheads 82 along the sides and rear of tray 36, and a central bulkhead 76 separating area 74 from the area above raised floor 60. Bulkheads 82 and 76 cooperate to organize optical fibers 14 and keep optical fibers 14 within tray 36 as tray 36 is swung from the open position shown in FIGS. 7 through 11 to the closed position shown in FIGS. 1 through 6. This will help prevent optical fibers 14 from being pinched or otherwise damaged. A plurality of connectors 84 are located between the various bulkheads 82 to physically connect adjacent bulkheads 82 and reinforce the structure of tray 36. Also reinforcing bulkheads 82 and the overall structure of tray 36 are a pair of triangular gussets 86 connecting a bulkhead 82 to front wall 38 adjacent latch 40.

Figure 10:
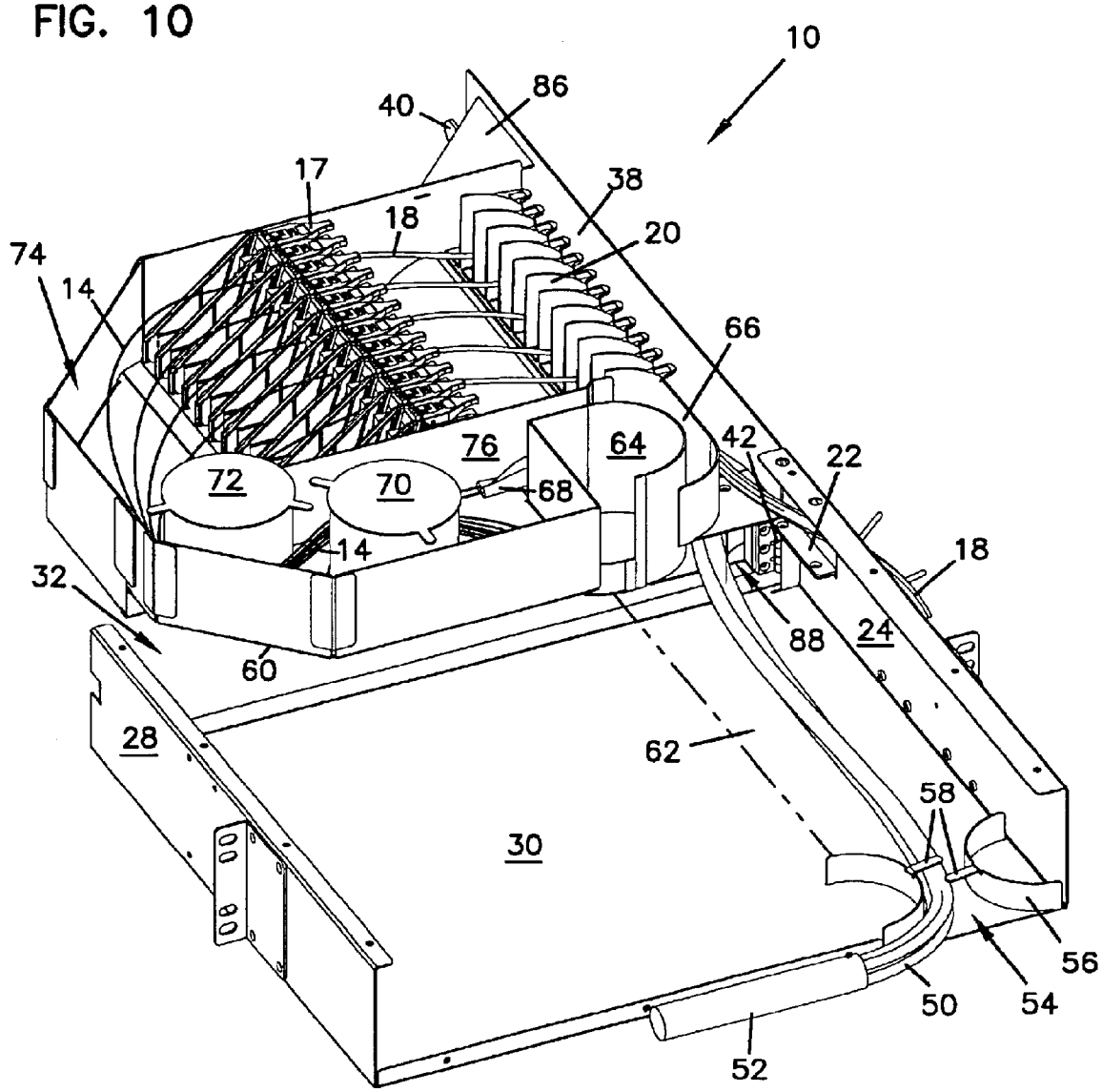
FIG. 10 is a second rear perspective view of the termination panel of FIG. 7.

Referring now to FIG. 10, cable 50 is shown entering tray 36 along ramp 65 between walls 64 and 66 through an opening 88 adjacent hinge 42. Between opening 88 and anchor 68, a ramp elevates cable 50 from the level of bottom 30 to the level of raised floor 60. Positioning opening 88 as close as possible to hinge 42 minimizes the amount of slack required in cable 50 within cable path 62 to permit tray 36 to swing between the open and closed positions. The further from hinge 42 that opening 88 is located, the more slack in cable 50 is required to permit tray 36 to move unhindered.

Similarly, cables 18 from the front of adapters 16 extend around fingers 20 and forward of outer wall 66 to exit through opening 22 which is also positioned as close as possible to hinge 42. This relative location helps reduce the amount of slack required in cables 18 to permit unhindered movement of tray 36.

Figure 11:
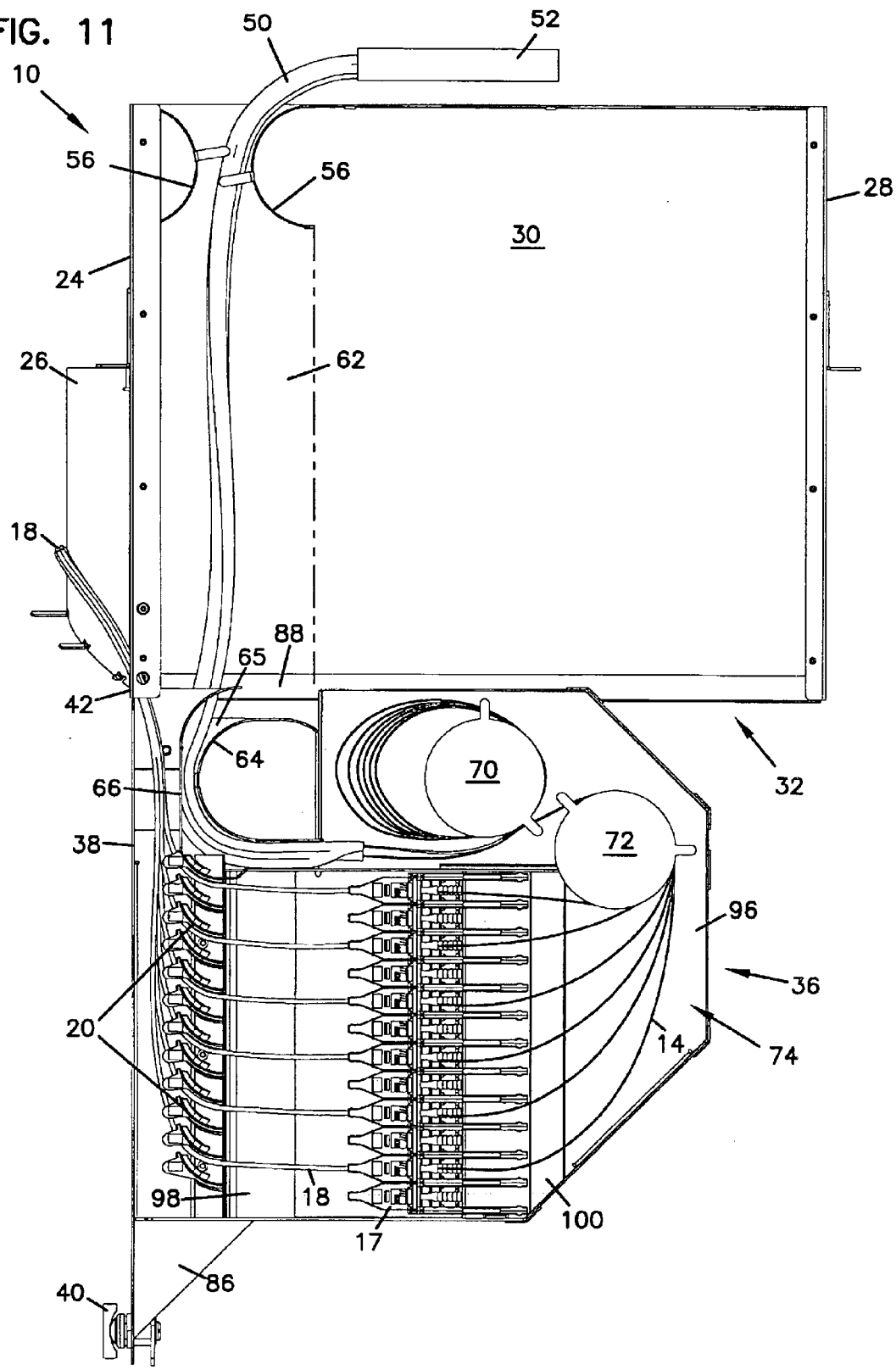
FIG. 11 is a top view of the termination panel of FIG. 7.
Figure 18:
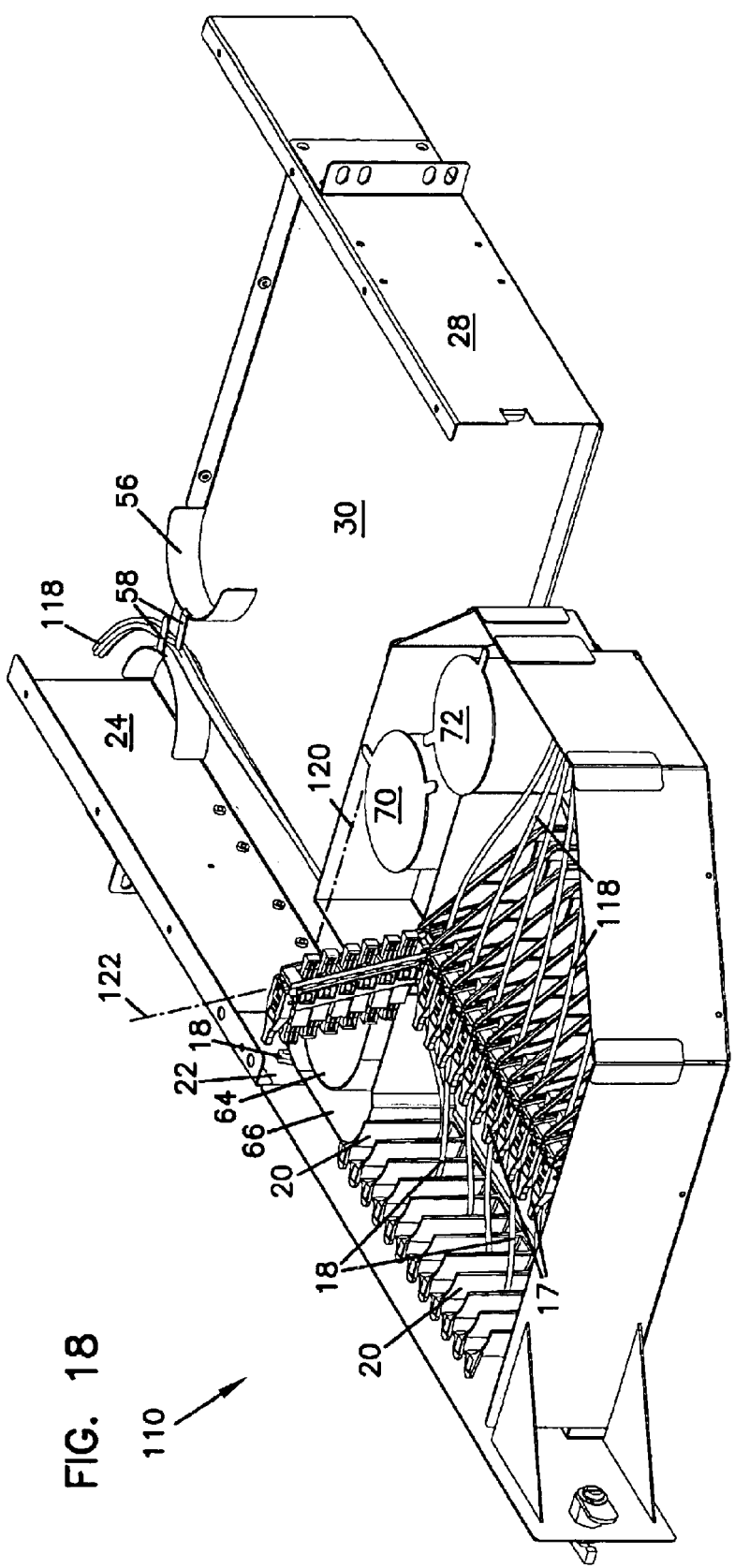
FIG. 18 is a front perspective view of the termination panel of FIG. 13, with the tray swung to an open position allowing access to the connections and one of the sliding connector modules extended upward to provide access to the connections of the modules.
Figure 19:
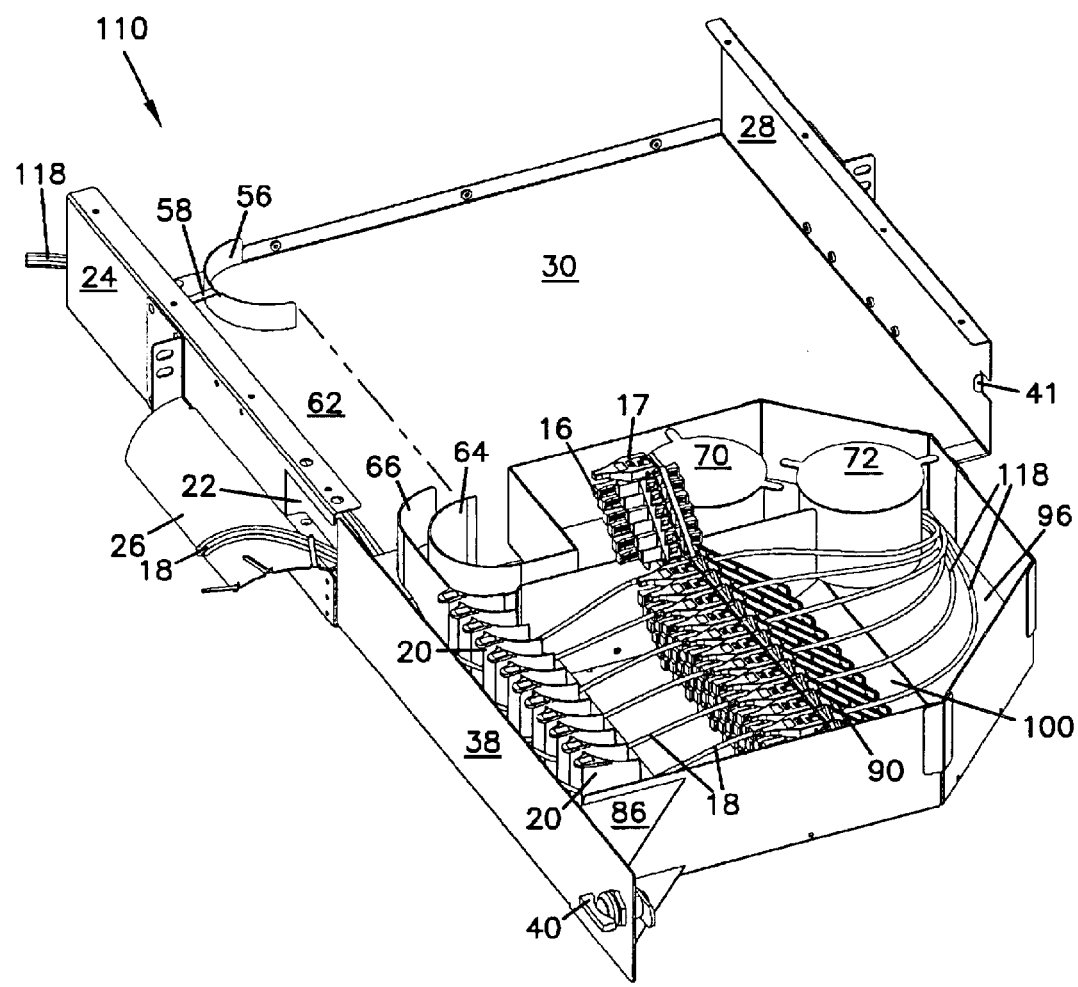
FIG. 19 is a second front perspective view of the termination panel of FIG. 18.
Figure 20:
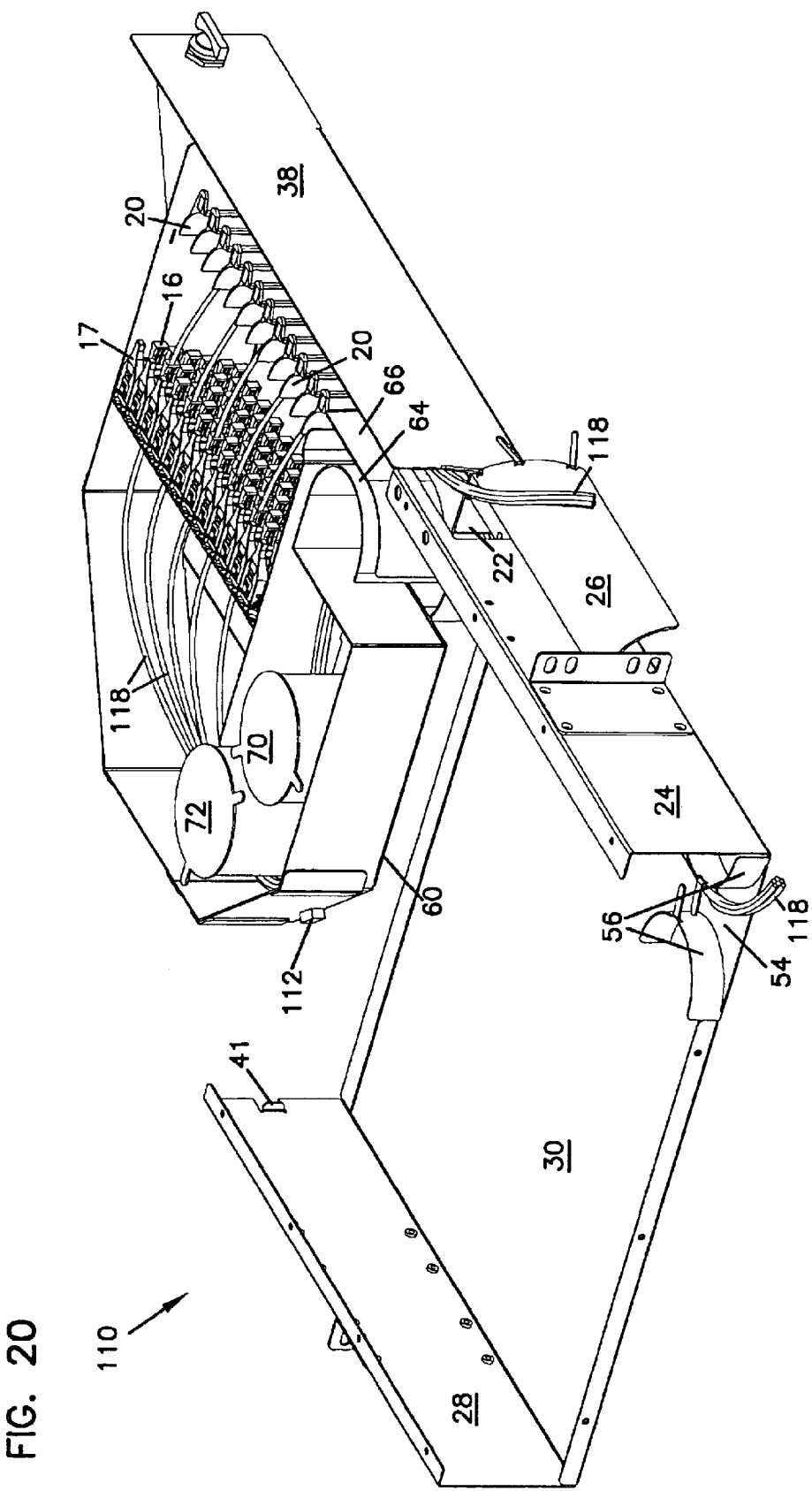
FIG. 20 is a rear perspective view of the termination panel of FIG. 18 with the connector module retracted.

When working with optical fibers within a telecommunications panel, it is desirable that direct viewing down the axis of any optical fibers be avoiding. Exposure to the high intensity laser light transmitted through optical fibers can cause significant harm to the vision of a worker subjected to accidental exposure. Orientation of the fiber within a panel or other device so that the axis of the fibers and any adapters is directed away from where a worker would be standing is desirable. Referring now to FIGS. 11 and 18, cables 14, adapters 16 and cables 18 are oriented parallel to the front of panel 10, as indicated by dashed line 120 in FIG. 18, when tray 36 is the open position. A worker accessing adapters 16 or the cables 14 and 18 connected to adapters 16 would most likely be standing directly in front of panel 10 when opening tray 36 and accessing the contents of panel 10. In this arrangement, with tray 36 in the open position, the risk of accidental exposure is reduced.

Figure 12:
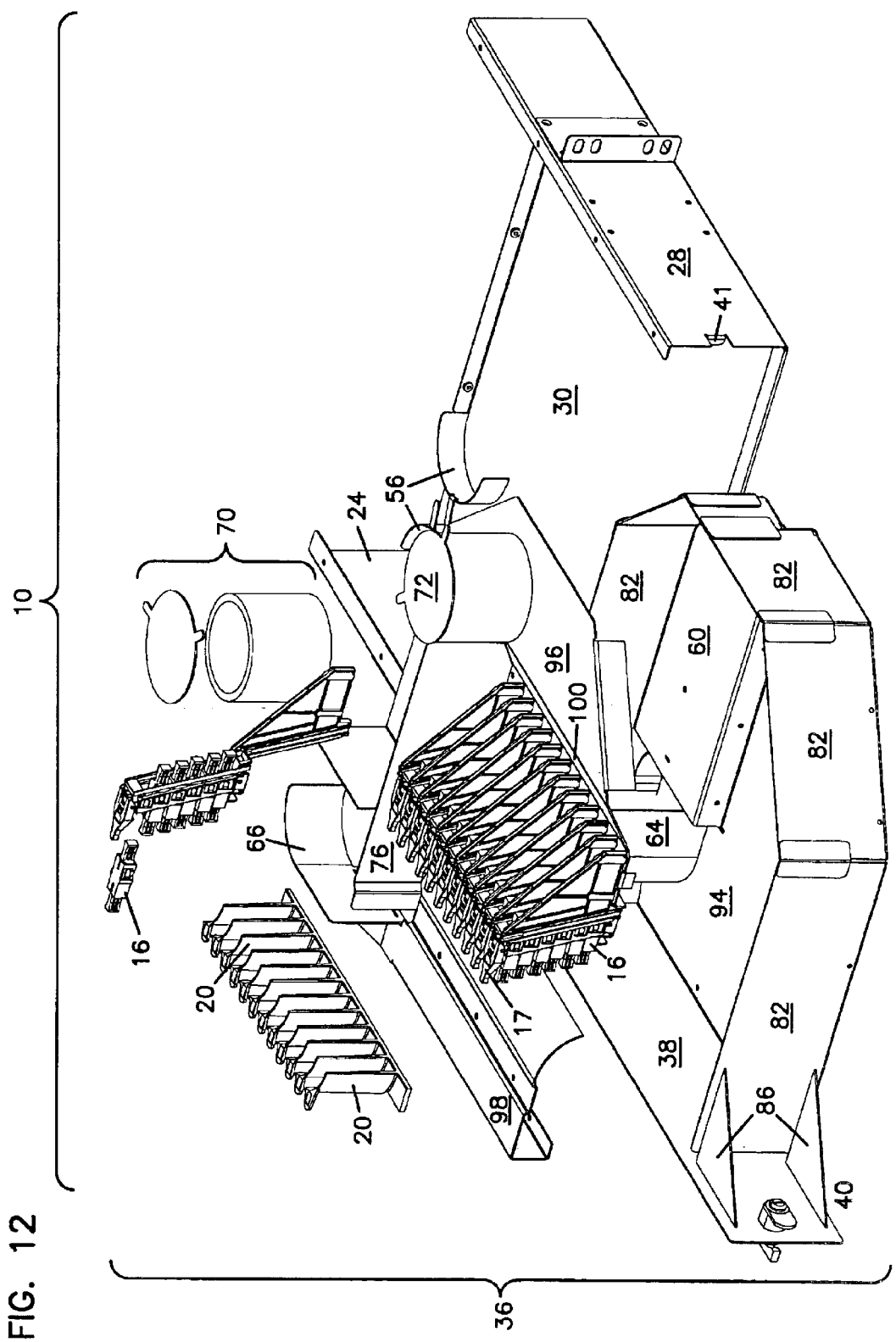
FIG. 12 is a partially exploded view of the termination panel of FIG. 7.
Figure 13:
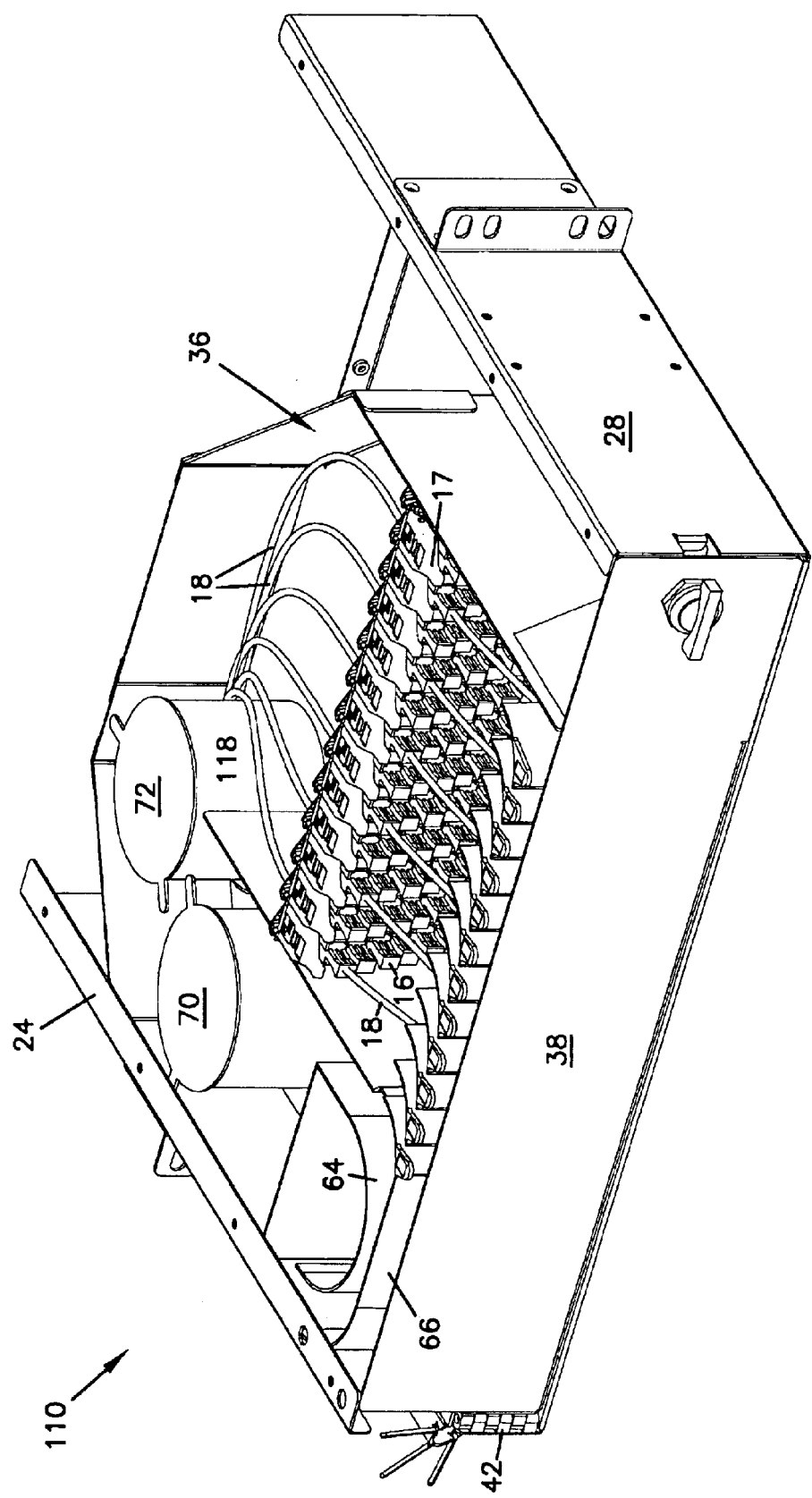
FIG. 13 is a front perspective view of a second embodiment of a termination panel according to the present invention.
Figure 14:
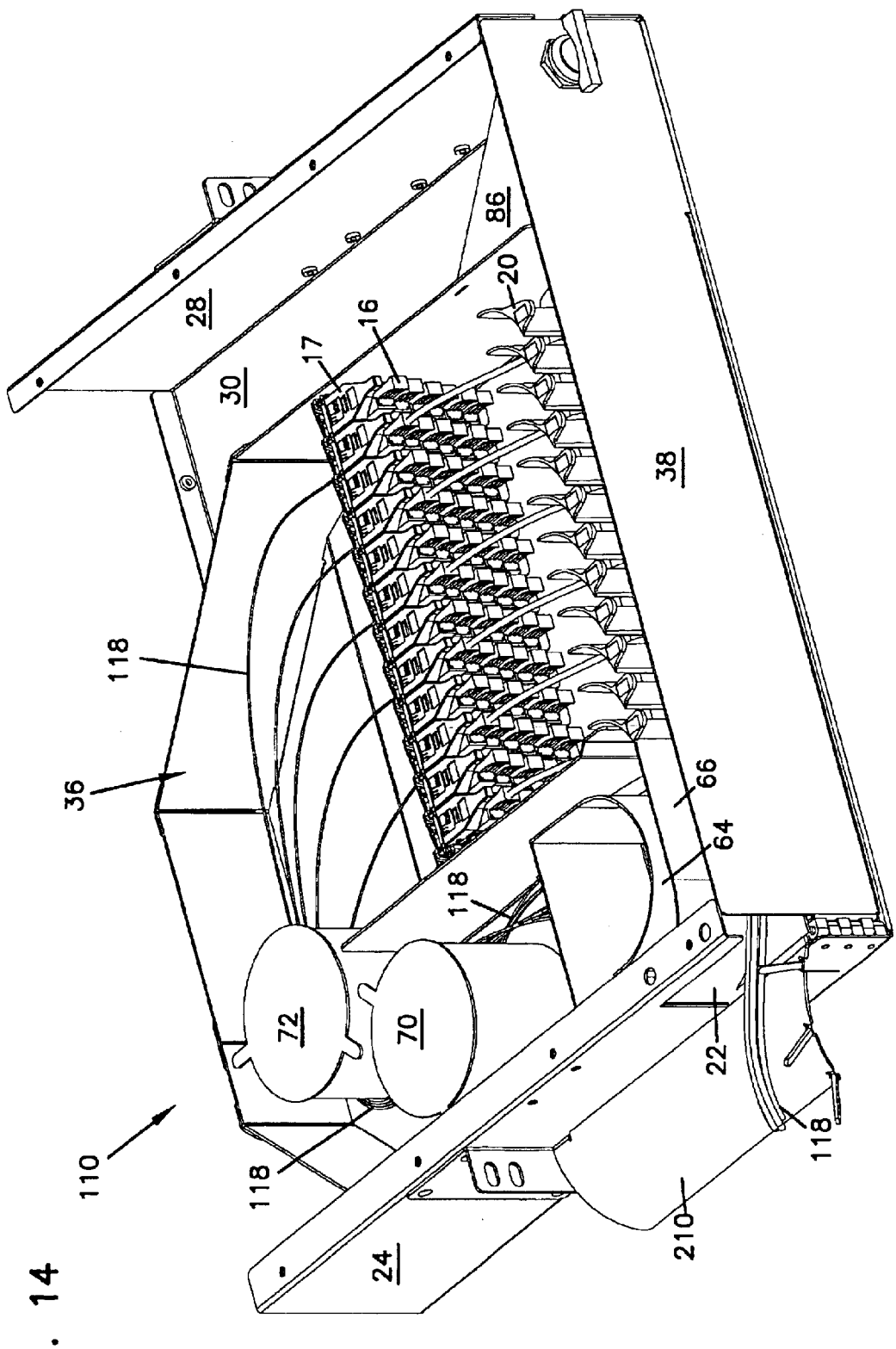
FIG. 14 is a second front perspective view of the termination panel of FIG. 13.

FIG. 12 shows additional detail regarding items mounted to tray 36, including the arrangement of adapters 16 within modules 17. Commonly owned U.S. Pat. Nos. 5,497,444, 5,717,810 and 5,758,003, and U.S. patent application Ser. No. 09/991,271, the disclosures of which are incorporated herein by reference, further describe and show the structure and features of modules 17. Briefly, each module 17 includes locations for mounting a plurality of adapters 16. As shown also in FIG. 18, discussed in more detail below, each module 17 is slidably mounted between a pair of walls 90 and may be extended generally upward above tray 36, in the direction of dashed line 122 in FIG. 18. Thus positioned, access to adapters 16 mounted to module 17 and any optical fiber cables attached to adapters 16 is improved. Walls 90 are configured to receive a sliding module 17 on each side, so that a total of thirteen walls 90 are required to support the twelve modules 17.

As disclosed in U.S. patent application Ser. No. 09/991, 271, and as shown in FIG. 18, modules 17 extend at an angle toward front 38. Adapters 16 are mounted at a corresponding angle to modules 17 so that the axis of insertion of fiber optic cables to the front and rear of each adapter 16 is substantially parallel to floor 94 of tray 36. Alternatively, walls 90 and modules 17 could be configured so that modules 17 slide vertically, with adapters 16 mounted horizontally to modules 17.

Tray 36 includes a floor 94 above which is a second raised floor 96 within area 74 adjacent the rear of adapters 16. As described above, raised floor 60 is offset above bottom 30 of panel 10 and cable path 62 is defined between raised floor 60 and bottom 30 adjacent side 24. Drums 70 and 72 are mounted to raised floor 96, a portion of which extends over raised floor 60. Raised floor 96 includes a ramp 100 extending down to the full depth of floor 94 and leading from area 74 to the rear of adapters 16. Forward of adapters 16 is a transition piece 98, to which are mounted the fingers 20. Cables 18 from the front of adapters 16 extend through and around fingers 20, forward of outer wall 66 and through opening 22 in side 24.

FIGS. 13 through 22 illustrate a second embodiment 110 of a telecommunications connection panel in accord with the present invention. This embodiment is constructed and configured substantially the same as panel 10. The principal difference is that panel 110 has patch cords or cables 118 extending through cable access port 54 instead of cable 50. The routing of cables 118 entering cable access port 54 follows cable path 62 along bottom 30 beneath raised floor 60 to opening 88 adjacent hinge 42. After being directed between walls 64 and 66, cables 118 extend about drum 72 into area 74 adjacent the rear of adapters 16. It is not necessary to pass cables 118 through anchor 68 as cables 118 emerge above raised floor 60. It is also not necessary to pass cables 118 about drum 70 to store slack. If a connector 19 of one of the cables 118 is damaged, the particular cable 118 can be removed and replaced entirely. Alternatively, since cables 118 are not clamped in a bundle by clamp 52, additional length can be pulled into panel 110 for a single cable 118 to be repaired or reterminated without unduly disturbing the other cables 118.

Panel 10 and panel 110 may be configured so that either will accept a multi-strand optical fiber cable such as cable 50 or single strand optical fiber cables such as cables 118 through cable access port 54. The presence of the features such as anchor 68 and first drum 70 for cables 50 do not impair the ability of panel 10 to accept and direct cables 118 to the rear of adapters 16.

Figure 15:
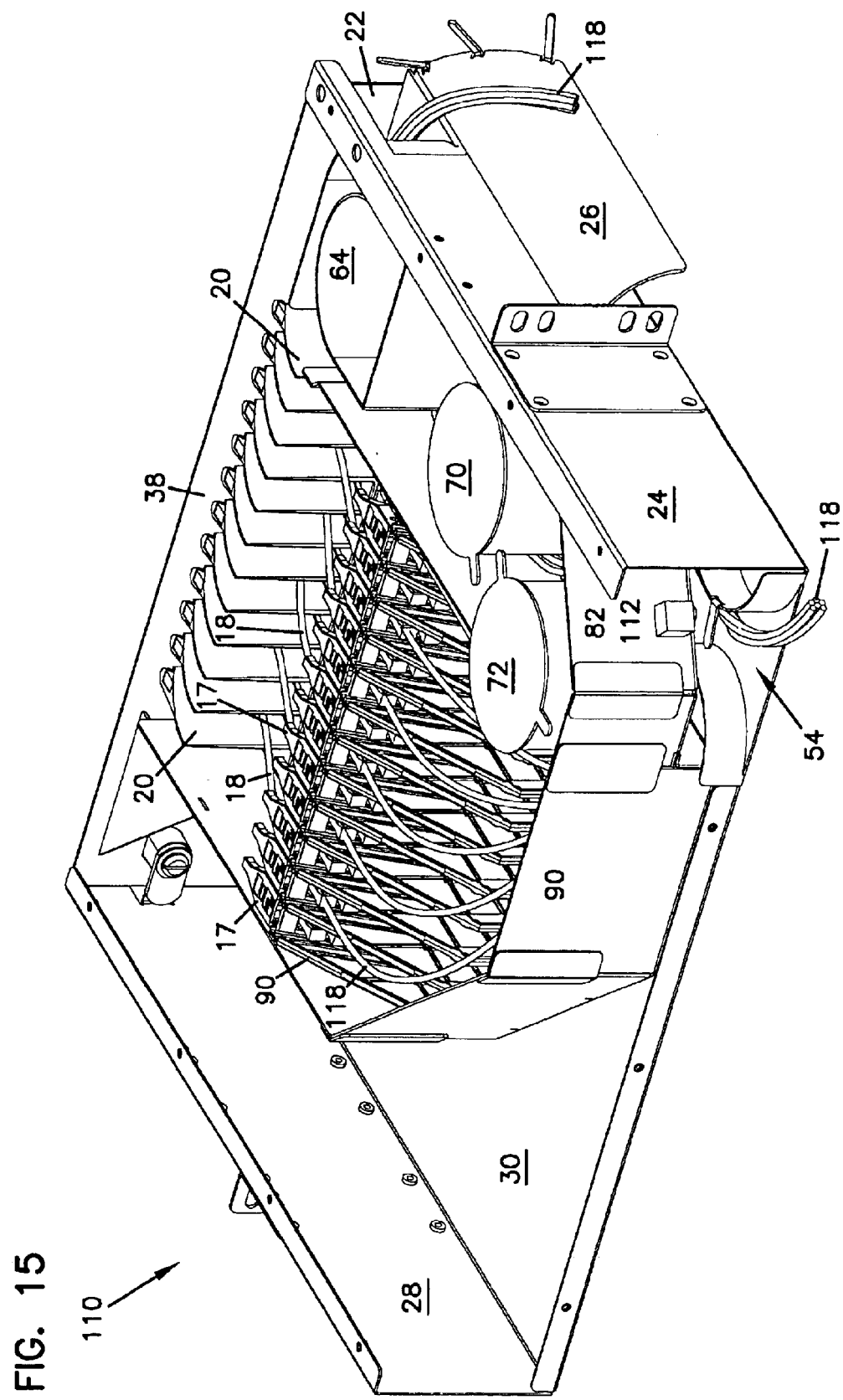
FIG. 15 is a rear perspective view of the termination panel of FIG. 13.
Figure 16:
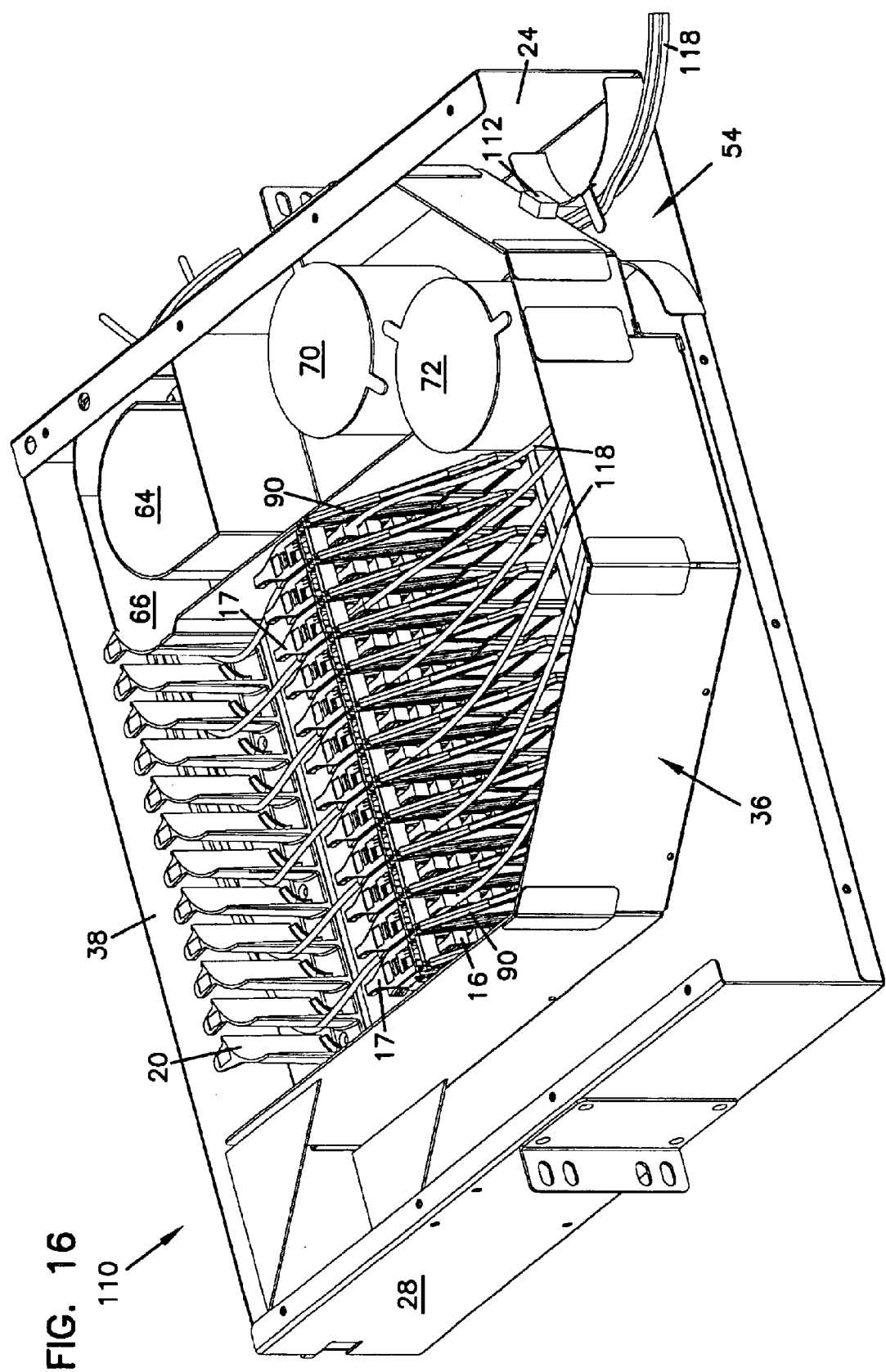
FIG. 16 is a second rear perspective view of the termination panel of FIG. 13.
Figure 17:
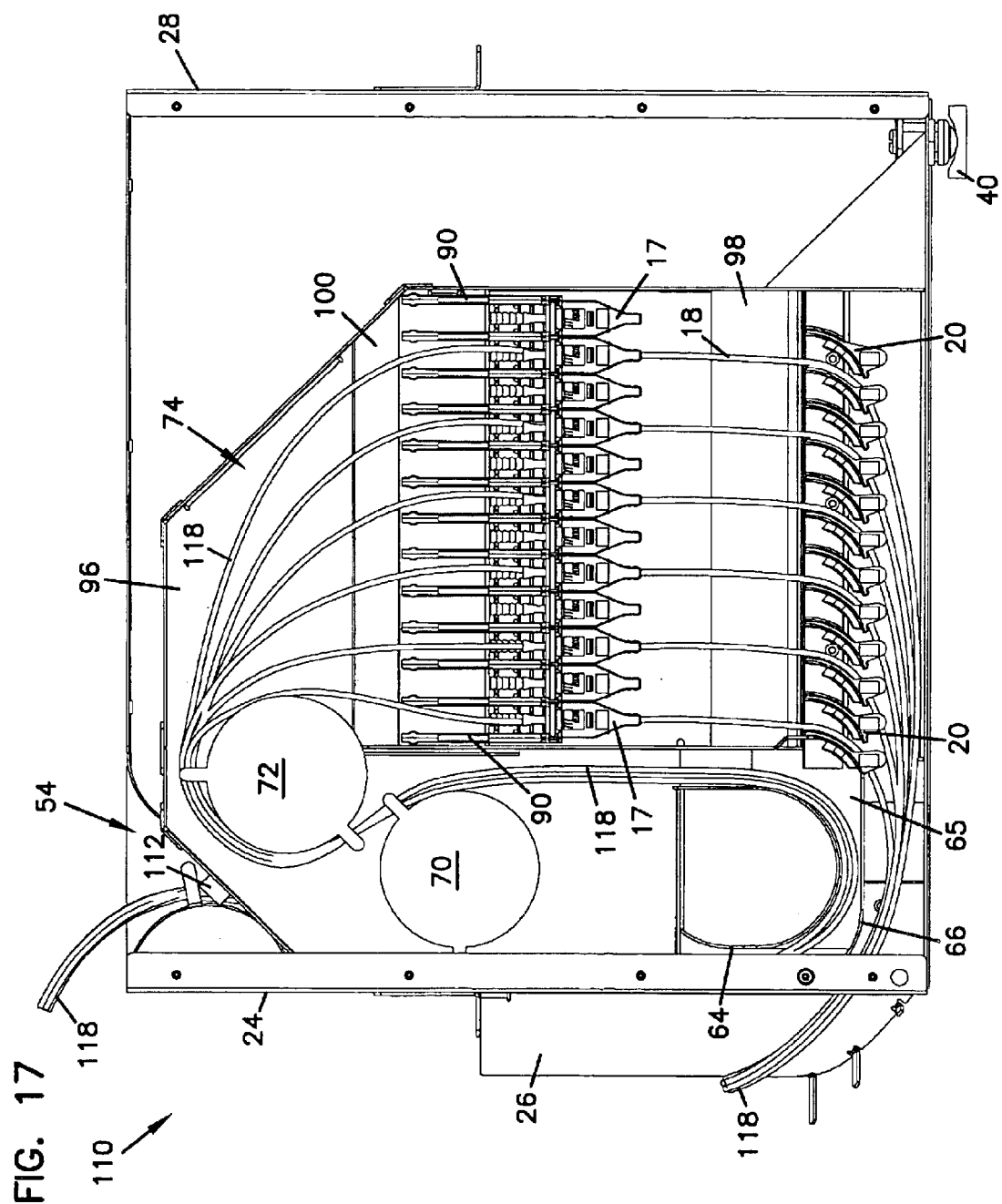
FIG. 17 is a top view of the termination panel of FIG. 13.
Figure 21:
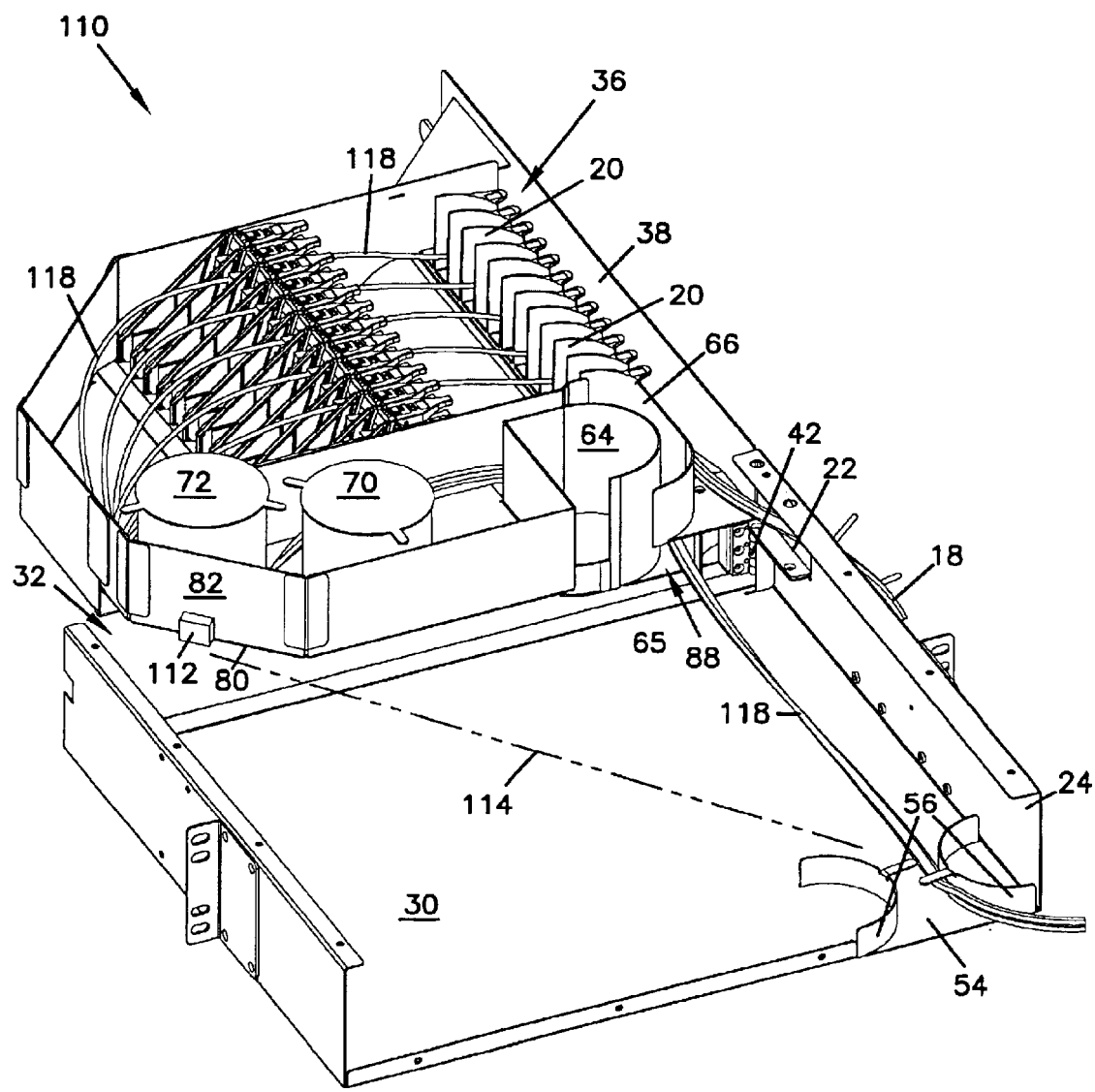
FIG. 21 is a second rear perspective view of the termination panel of FIG. 20.
Figure 22:
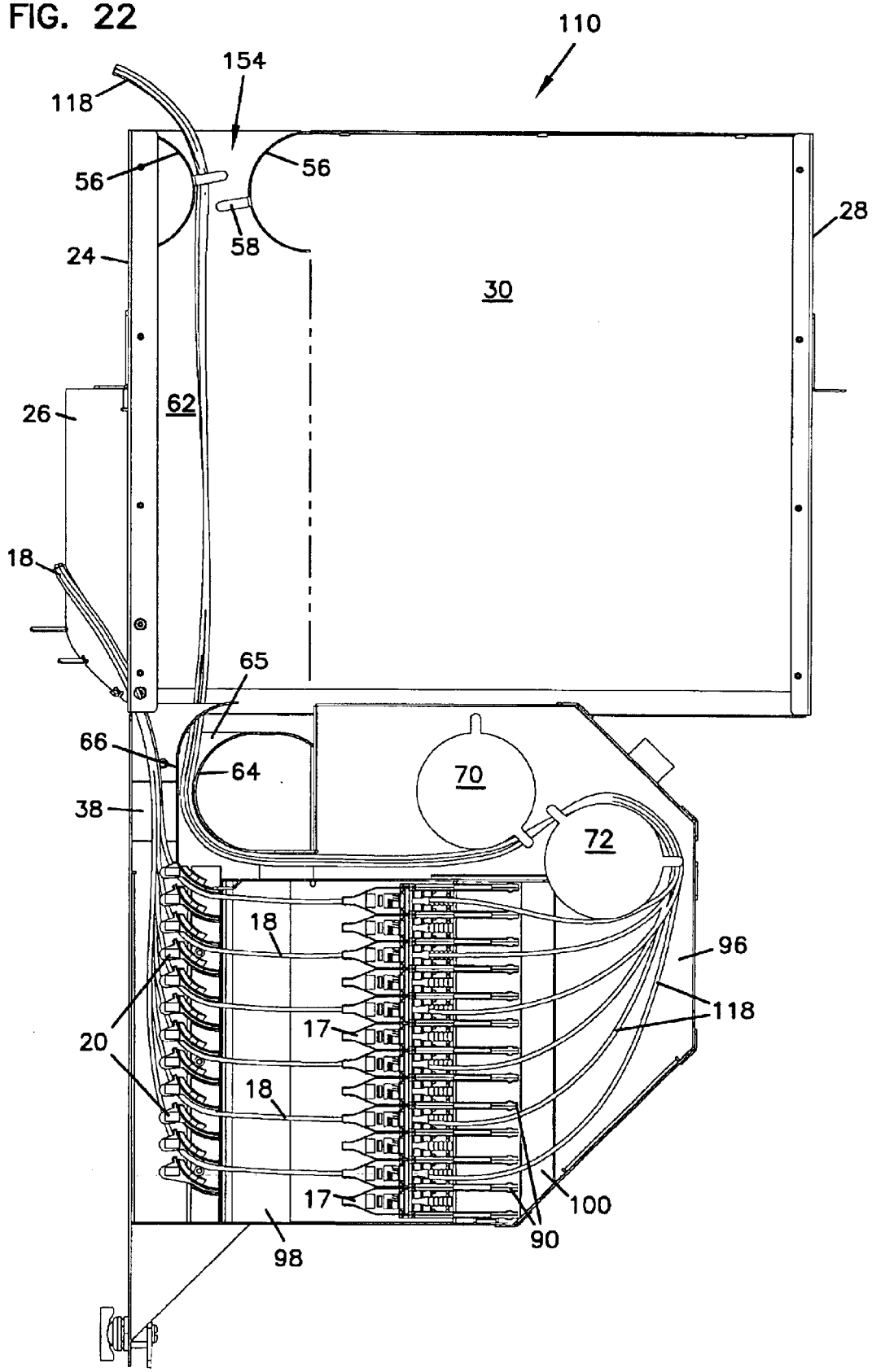
FIG. 22 is a top view of the termination panel of FIG. 20.

Referring now to FIG. 15, mounted to bulkhead 82 along second angled corner 80 of tray 36 is a temporary cable clamp 112. Clamp 112 is directly above cable access port 54 and aids in the loading of cables into tray 36 of panel 110. To load a new cable 118 (or a cable 50) into tray 36 without clamp 112, a worker would need to swing tray 36 to the open position, allowing access through front opening 32 adjacent side 28, as shown in FIG. 21. The worker would then have to reach through opening 32 across the entire diagonal distance of panel 110 to reach the new cable 118 at cable access port 54 adjacent side 24. Panel 110 may be approximately nineteen to twenty-three inches wide between sides and similarly dimensioned front to rear. Reaching across this diagonal distance when panel 110 is mounted within rack 12 may be difficult for some workers, particularly if panel 110 is mounted near the top or bottom of rack 12.

Clamp 112 permits loading of cables 118 into panel 110 without the need to extend an arm through the interior of panel 110. When tray 36 is in the closed position, as shown in FIG. 15, clamp 112 is accessible through cable access port 54. An end of a new cable 118 is lead to cable access port 54 and attached to clamp 112. Tray 36 is then swung to the open position, as shown in FIG. 21. The end of new cable 118 is pulled through panel 110 and out opening 32. As indicated by the dashed line 114 in FIG. 21, new cable 118 extends across the diagonal of bottom 30. New cable 118 can then be detached from clamp 112 and routed through opening 88 into tray 36 along the other cables 118.

It is anticipated that panels 10 and 110 may modified to provide connection locations for high speed copper cables as well as optical fiber cables. As copper cables are used to transmit data at higher speed, bend radius rules similar to those for optical fiber cables need to be enforced within the network. As with optical fiber, it is desirable to have higher densities of connections within copper panels as well.

Figure 23:
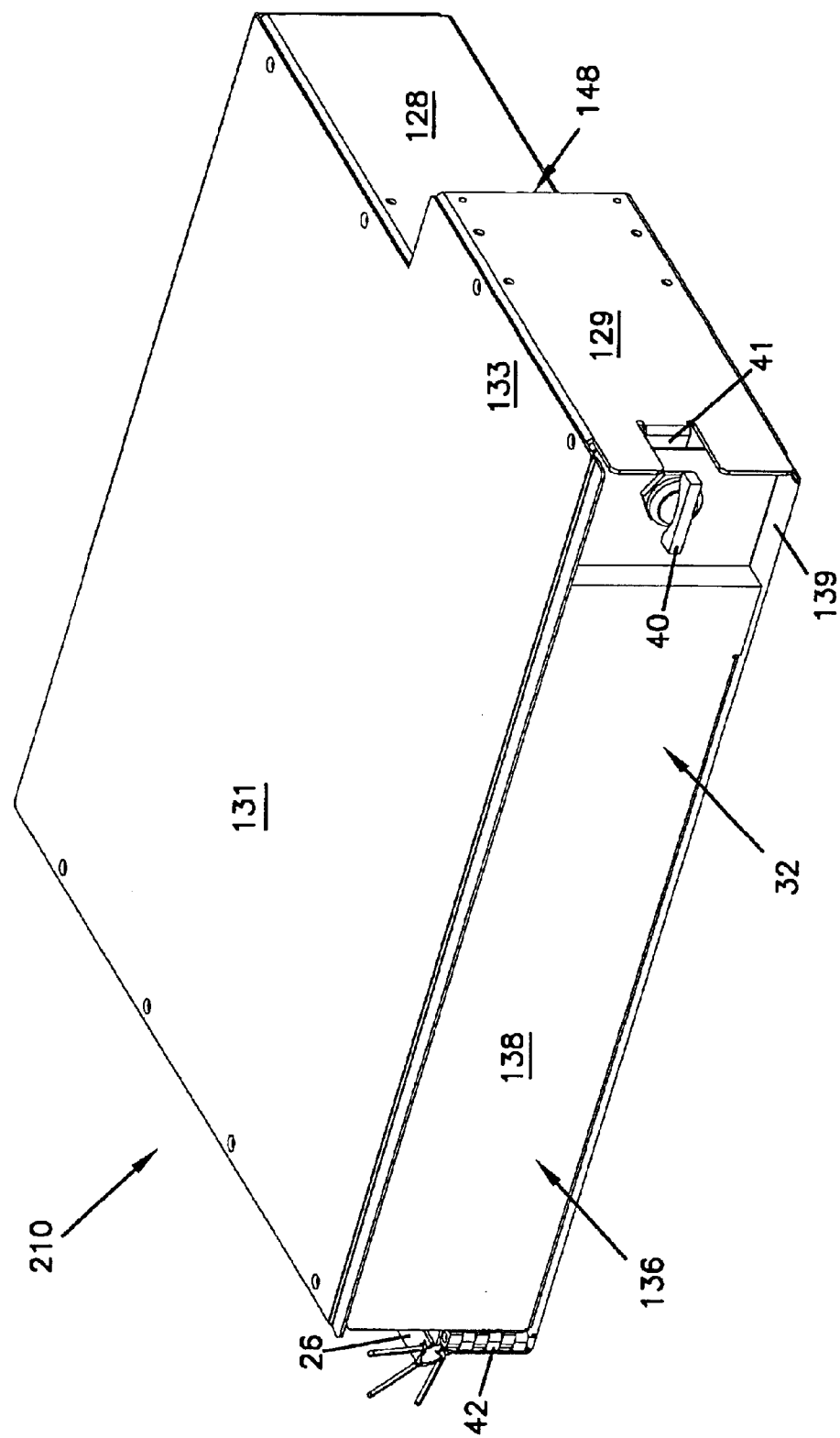
FIG. 23 is a front perspective view of a third embodiment of a termination panel according to the present invention, with the tray in the closed position.

Referring now to FIG. 23, a third alternative embodiment of a telecommunications termination panel 210 is illustrated. Panel 210 includes a top 131 with an extension 133 which overlays an extended portion 129 of side 128. Side 128 also includes a mounting portion 148 forming a mounting flange for mounting panel 210 to rack 12. A front wall 138 includes a recessed portion 139 adjacent latch 40 and extended portion 129. Front wall 138 closes off opening 32 when a tray 136 of panel 210 is in the closed position as shown in FIG. 23.

Figure 24:
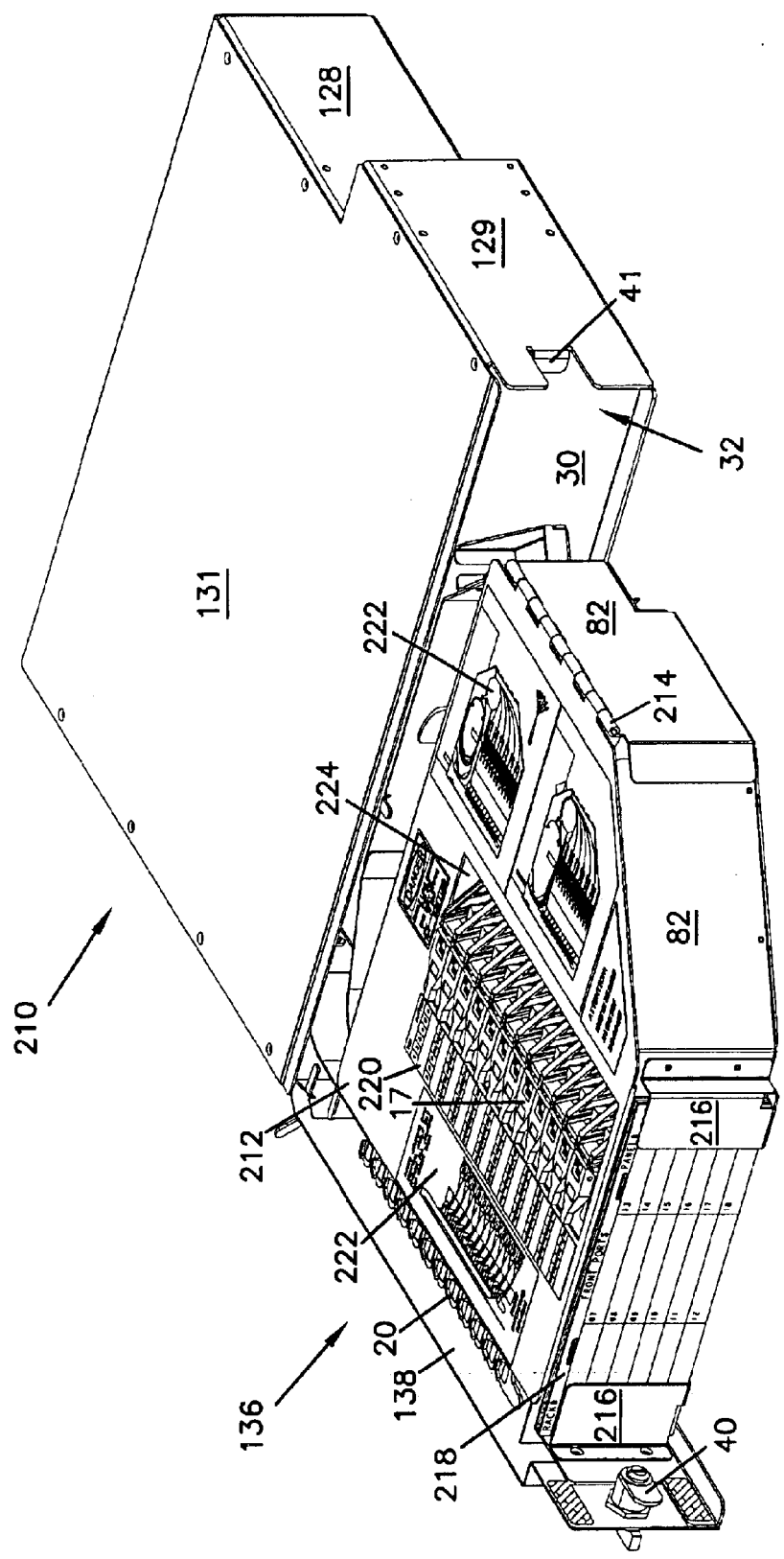
FIG. 24 is a front perspective view of the termination panel of FIG. 23, with the tray in the open position.

Referring now to FIG. 24, tray 136 is shown pivoted to the open position. A cover 212 is hingedly mounted to tray 136 by a hinge 214 along a rear bulkhead 82. As shown in FIG. 24, cover 212 is in an operational position, allowing tray 136 to be moved between the open and closed positions. Also mounted along a bulkhead 82 is a pair of card holders 216 for holding information cards 218. Information cards 218 may be instruction cards, warning labels, routing information cards or designation strips related to the configuration and use of panel 210. Card holders 216 are positioned so that cards 218 are housed within panel 10 when tray 136 is in the closed position but are easily accessible to a user when tray 136 is in the open position. Cover 212 also includes an opening 224 through which modules 17 are visible. Opening 224 permits any identification or other information printed or attached to modules 17 to be visible when cover 212 is in the operational position. Designation labels 220 may be positioned adjacent opening 224 to indicate the source and destination of cables attached to adapters 16. Cover 212 may also include one or more routing diagrams 222 to illustrate to the user the recommended path of cables within panel 210.

Figure 25:
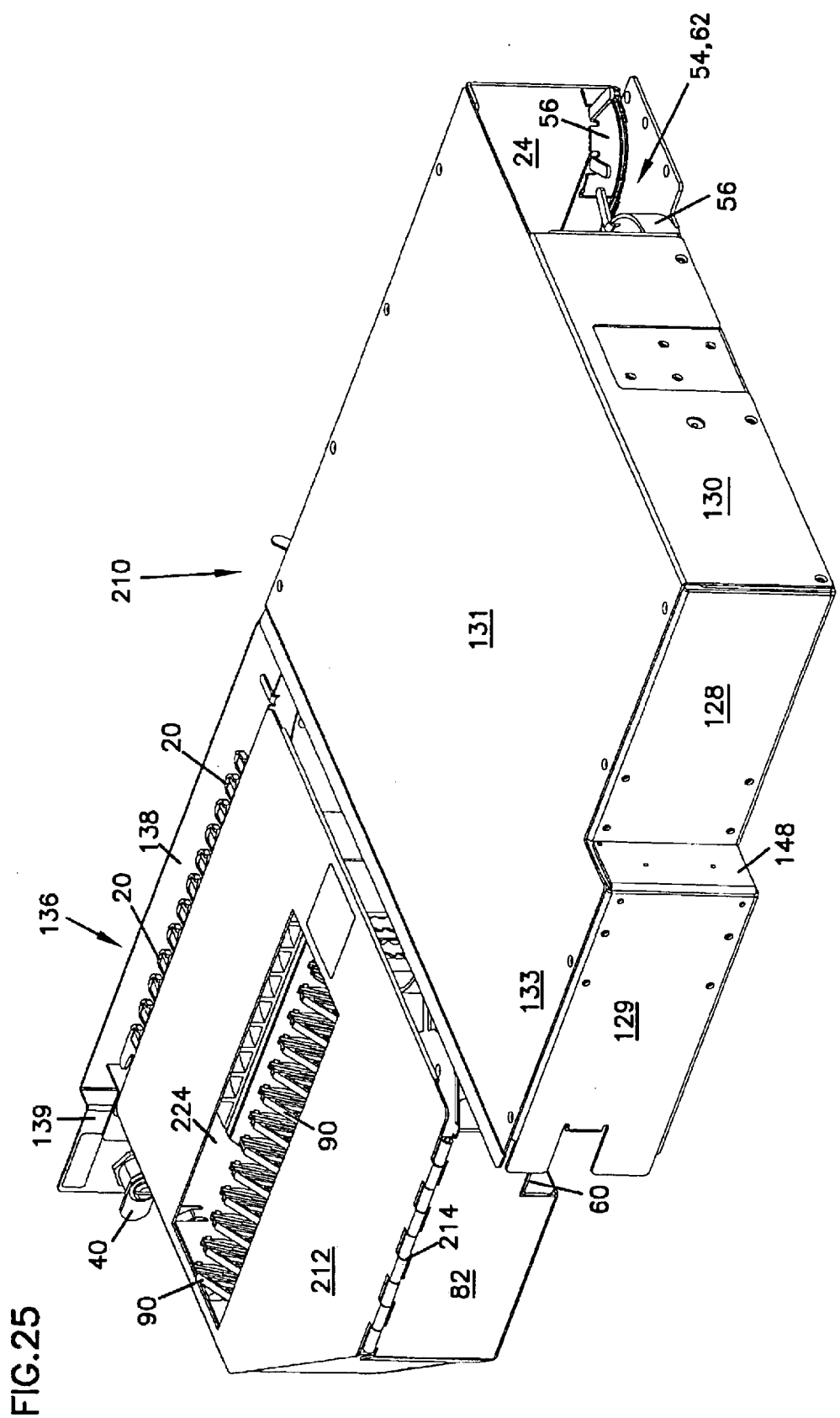
FIG. 25 is a rear perspective view of the termination panel of FIG. 24, with the modules, designation strips, and warning labels removed for clarity.

Referring now to FIG. 25, rear wall 130 substantially closes off the rear of panel 210 except for rear opening 54. As shown, rear wall 130 is a downward extension of top 131. It is anticipated that a rear wall closing off the rear of the housing except for the rear opening could be an upward extending portion of bottom 30 (as shown in the FIGS. below) or a separate piece fastened to panel 210.

Figure 26:
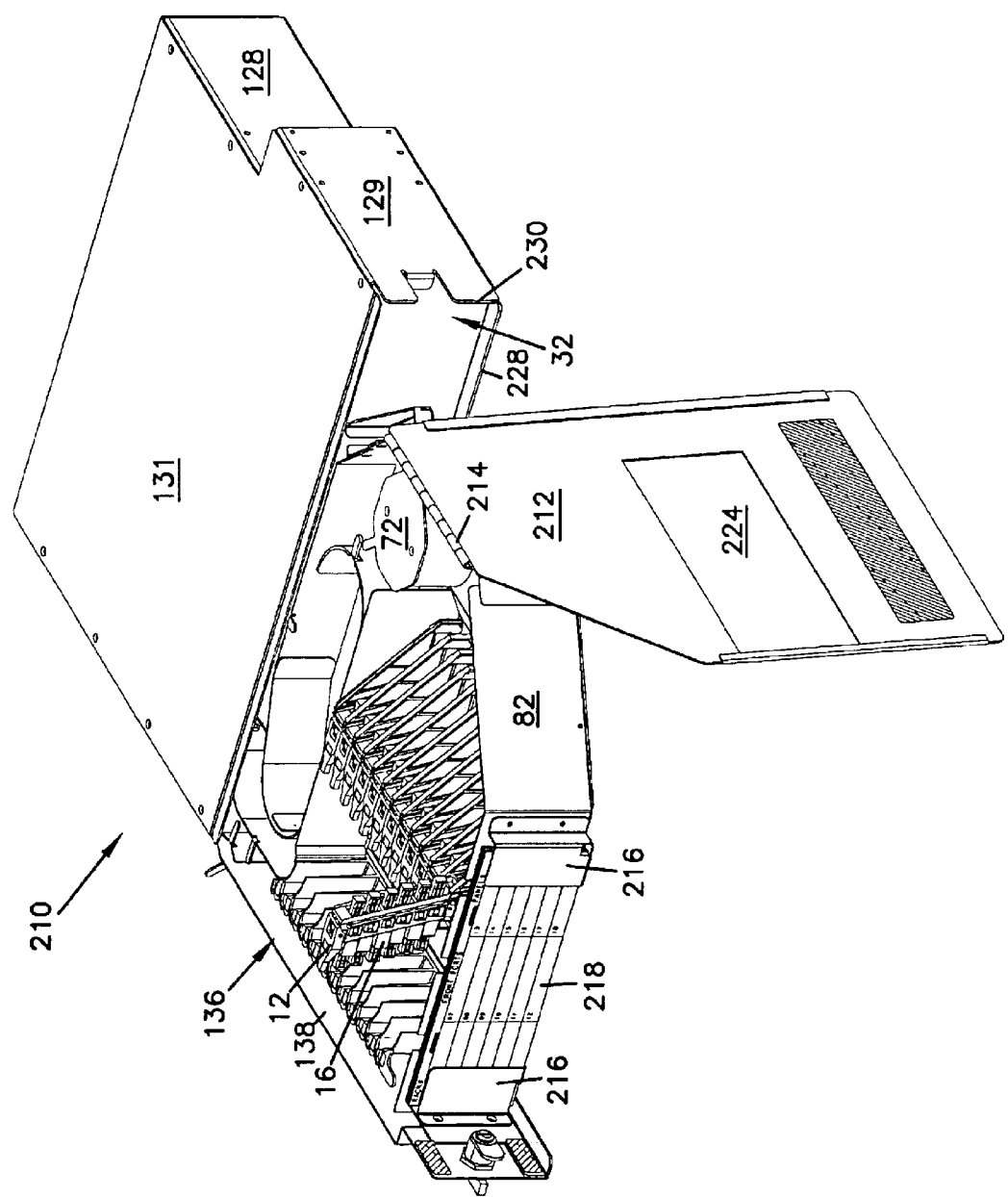
FIG. 26 is a front perspective view of the termination panel of FIG. 24, with the cover in an access position and one of the modules extended upward.
Figure 27:
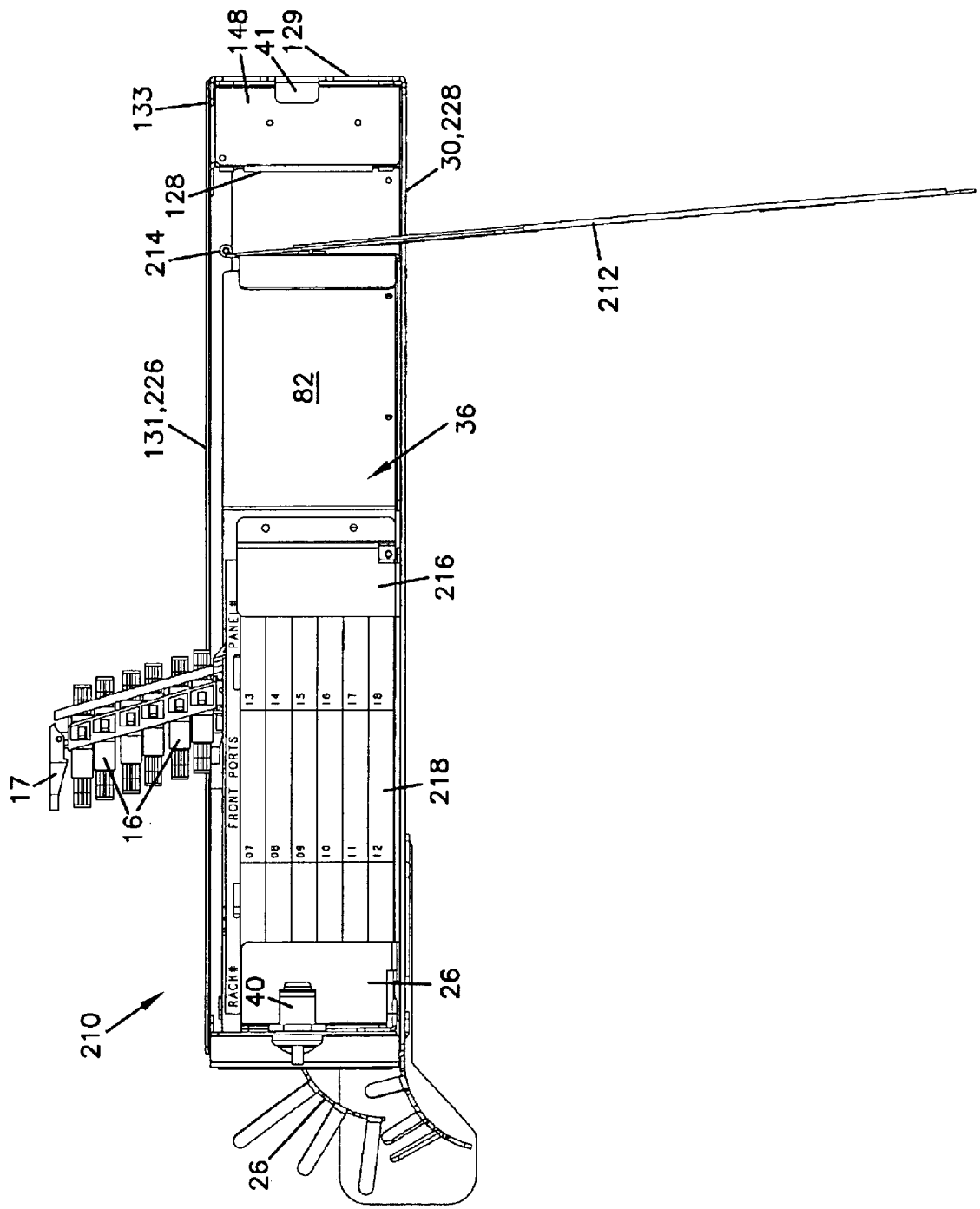
FIG. 27 is a front view of the termination panel of FIG. 26.
Figure 28:
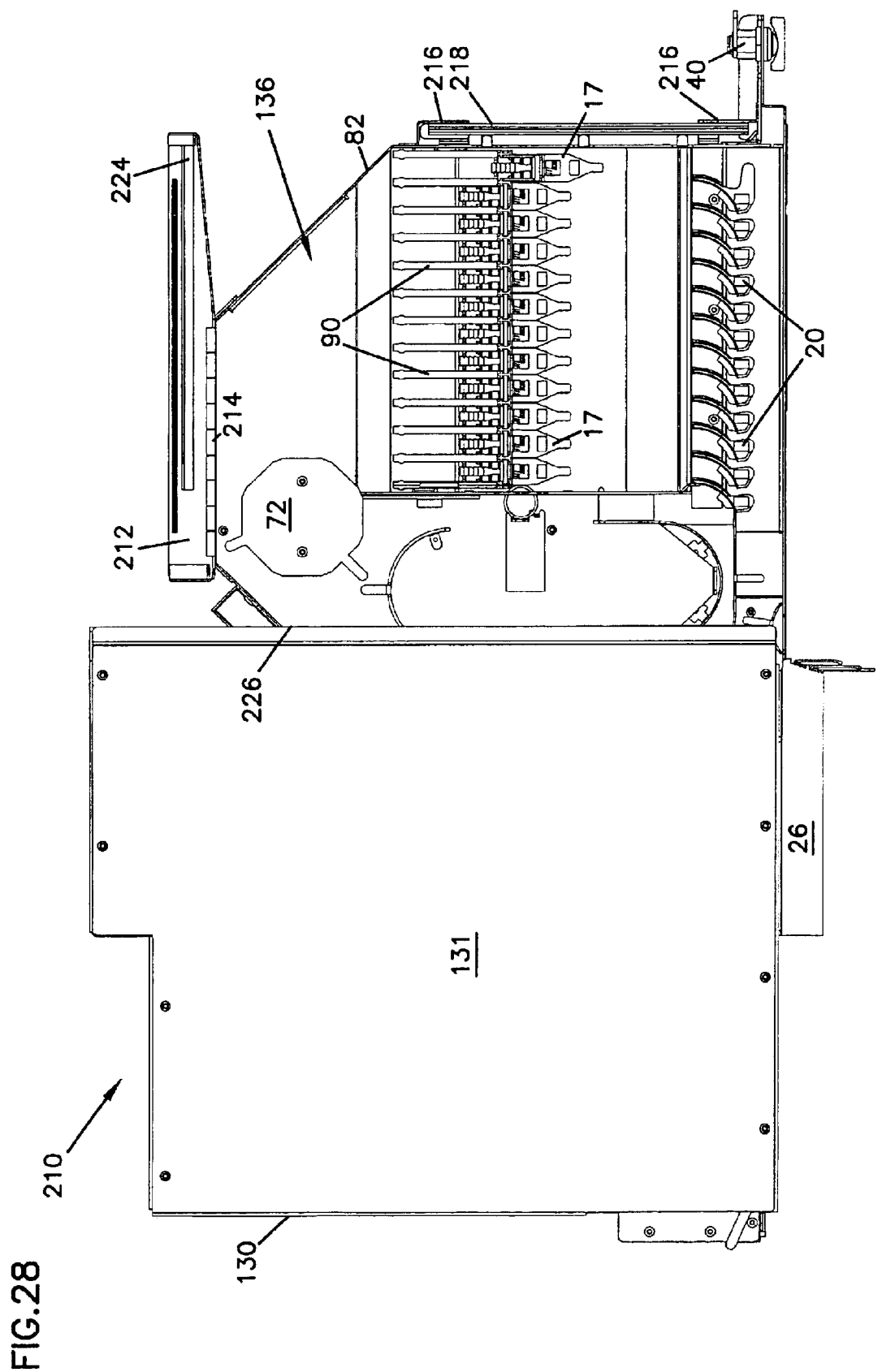
FIG. 28 is a top view of the termination panel of FIG. 26.

Referring now to FIGS. 26 to 28, panel 210 is illustrated with tray 136 in the open position and cover 212 in a position permitting access to adapter 16, modules 17 and any cables which might lead to or away from adapters 16. If tray 136 were closed with module 17 so extended, front edge 226 of top 131 might damage module 17, one or more of the adapters 16 mounted to module 17 or any cables leading to or from these adapters 16. To prevent such a closure and the potential resulting damage, cover 212 is configured to prevent movement of tray 136 to the closed position when cover 212 is not in the operational position (as shown in FIGS. 24 and 25). As shown in FIGS. 26 to 28, cover 212 is in the access position and any attempt to close tray 136 will result in cover 212 hitting a front edge 228 of bottom 30. If cover 212 is in an intermediate position between the operational and access positions (as shown below in FIGS. 29 to 31), cover 212 will hit front edge 226 of top 131, preventing closure of tray 136. Also, when cover 212 is in the operational position, cover 21 will ensure that no cables within tray 136 extend above bulkheads 82. Any cables extending above bulkheads 82 may be pinched or otherwise damaged by front edge 226 of top 131.

Figure 29:
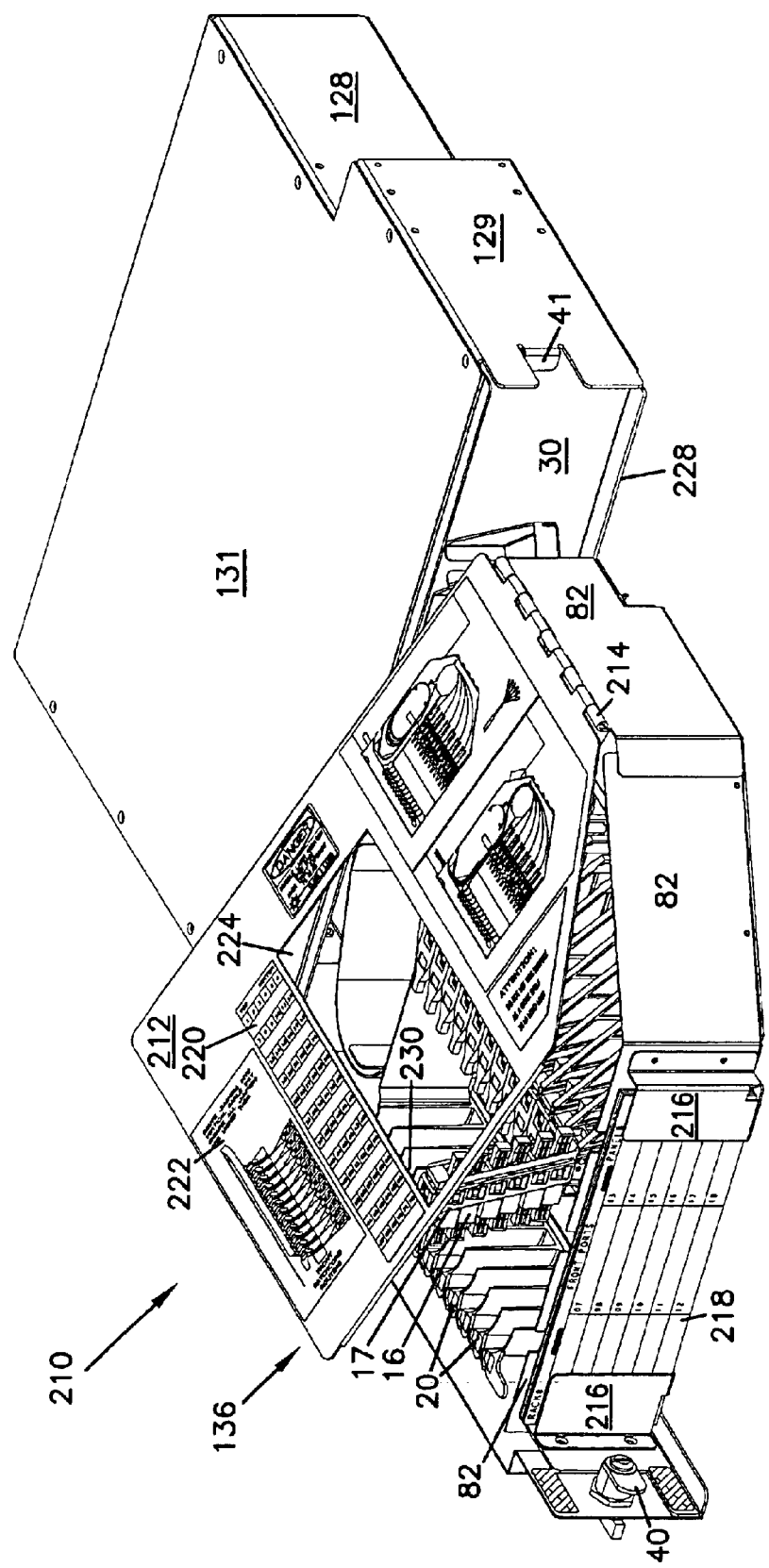
FIG. 29 is a front perspective view of the termination panel of FIG. 24, with one of the modules extended upward and the cover in an intermediate position between the access position and the operational position.
Figure 30:
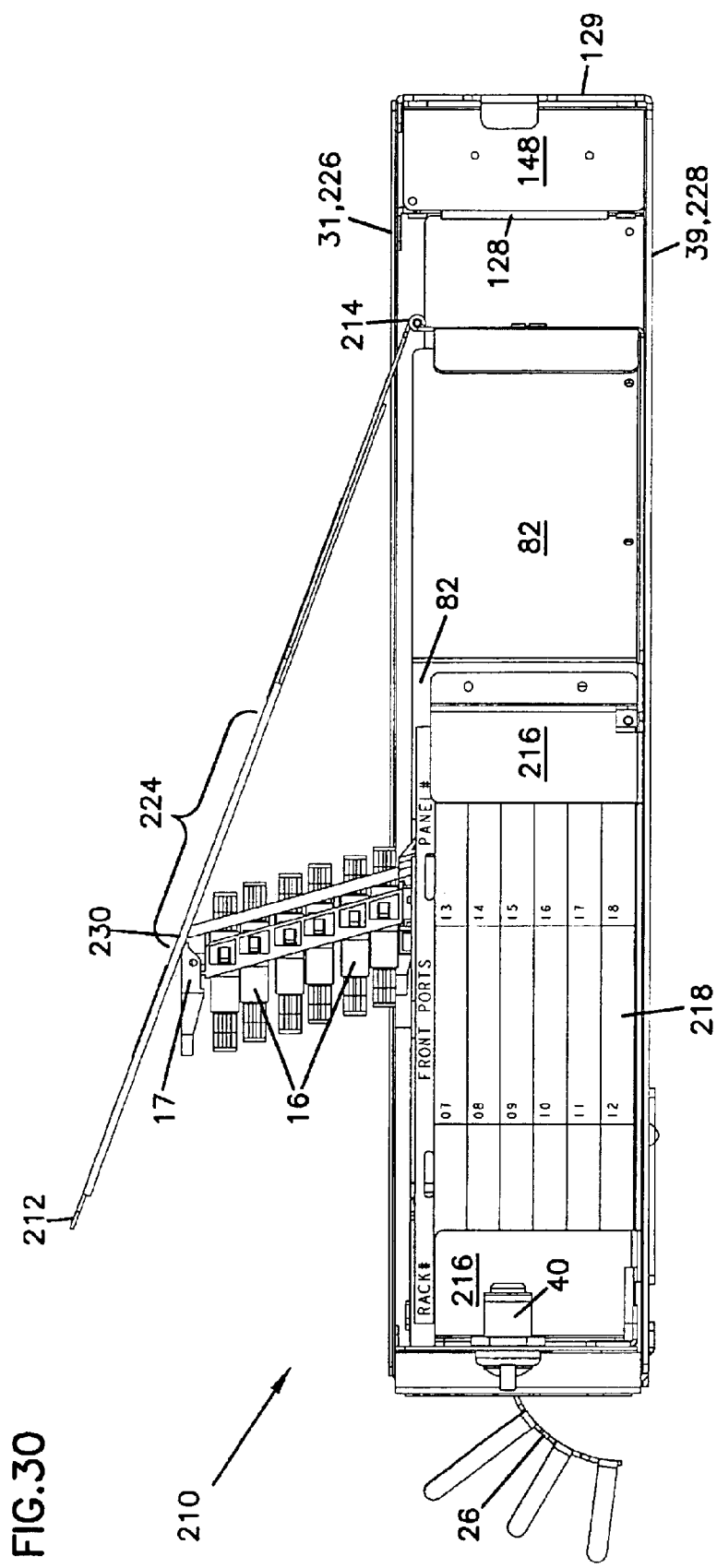
FIG. 30 is a front view of the termination panel of FIG. 29.
Figure 31:
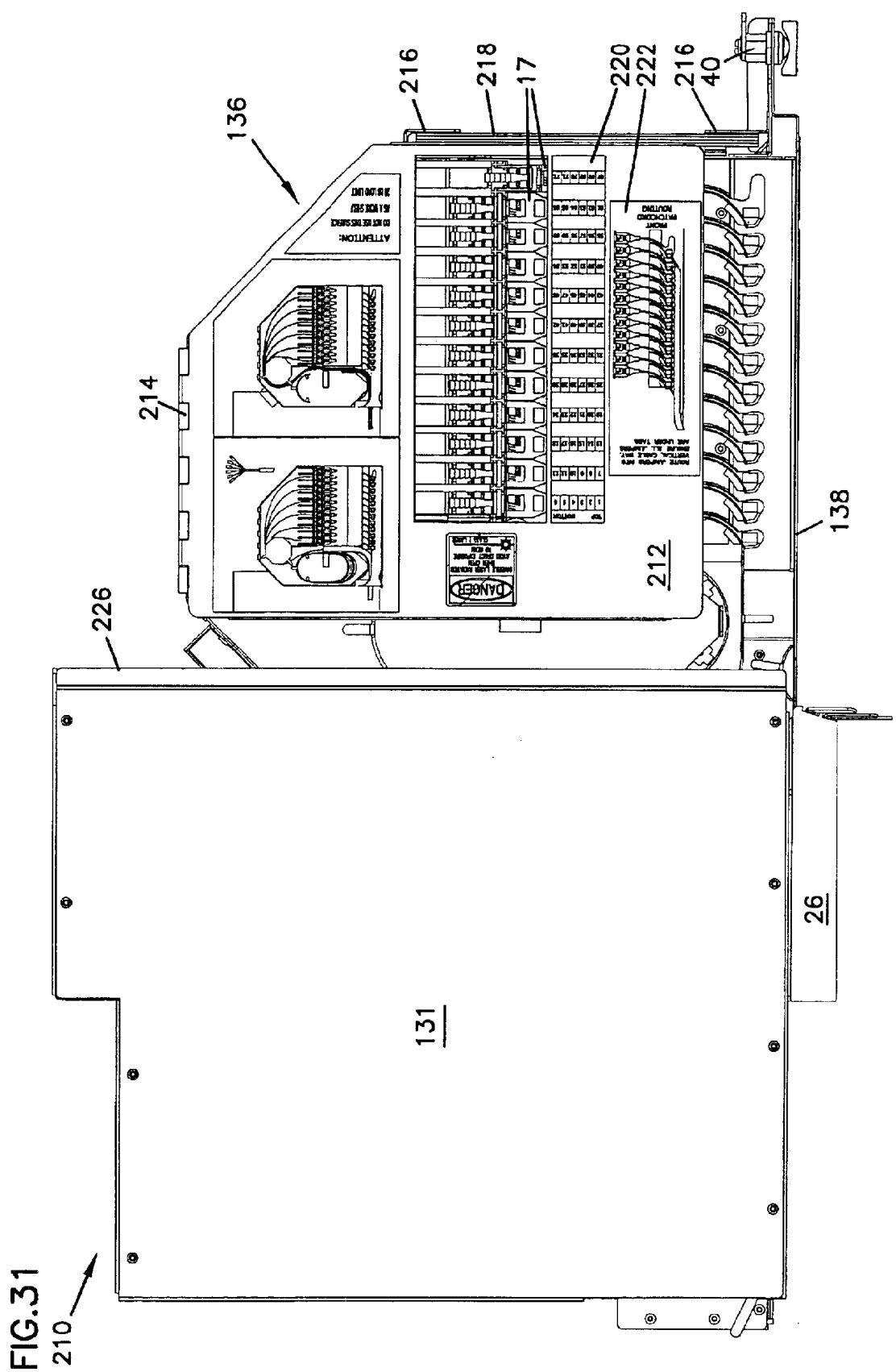
FIG. 31 is a top view of the termination panel of FIG. 29.

Referring now to FIGS. 29 to 31, cover 212 is shown in an intermediate position between the access and operational positions. These FIGS. illustrate how cover 212 interacts with a module 17 which was extended upward and not retracted prior to cover 212 being moved from the access position of FIGS. 26 to 28 to the operational position of FIGS. 24 and 25. The upper end of the extended module 17 strikes cover 212 adjacent an edge 230 of opening 224. Opening 224 is positioned and configured to prevent cover 212 from being closed with a module 17 extended upward while still allowing visibility of modules 17 when cover 212 is in the operational position. When a module 17 is extended and interacts with cover 212 as shown in FIGS. 29 to 31, cover cannot be moved to the operational position and tray 136 cannot be closed. This prevent damage to the extended module 17 as described above.

Opening 224 is also configured and positioned so as to prevent any cables connected to the rear of the upper most adapters 16 of the extended module 17 from being pinched or otherwise damaged when cover 212 interacts with the extended module 17. In the absence of opening 224 configured and positioned as shown, such a cable would be struck by cover 212 before cover 212 strikes the extended module 17. The pressure of cover 212 could cause the cable to kink or bend tighter than the desired bend radius and possibly degrade the ability of the cable to transmit optical signals.

Figure 32:
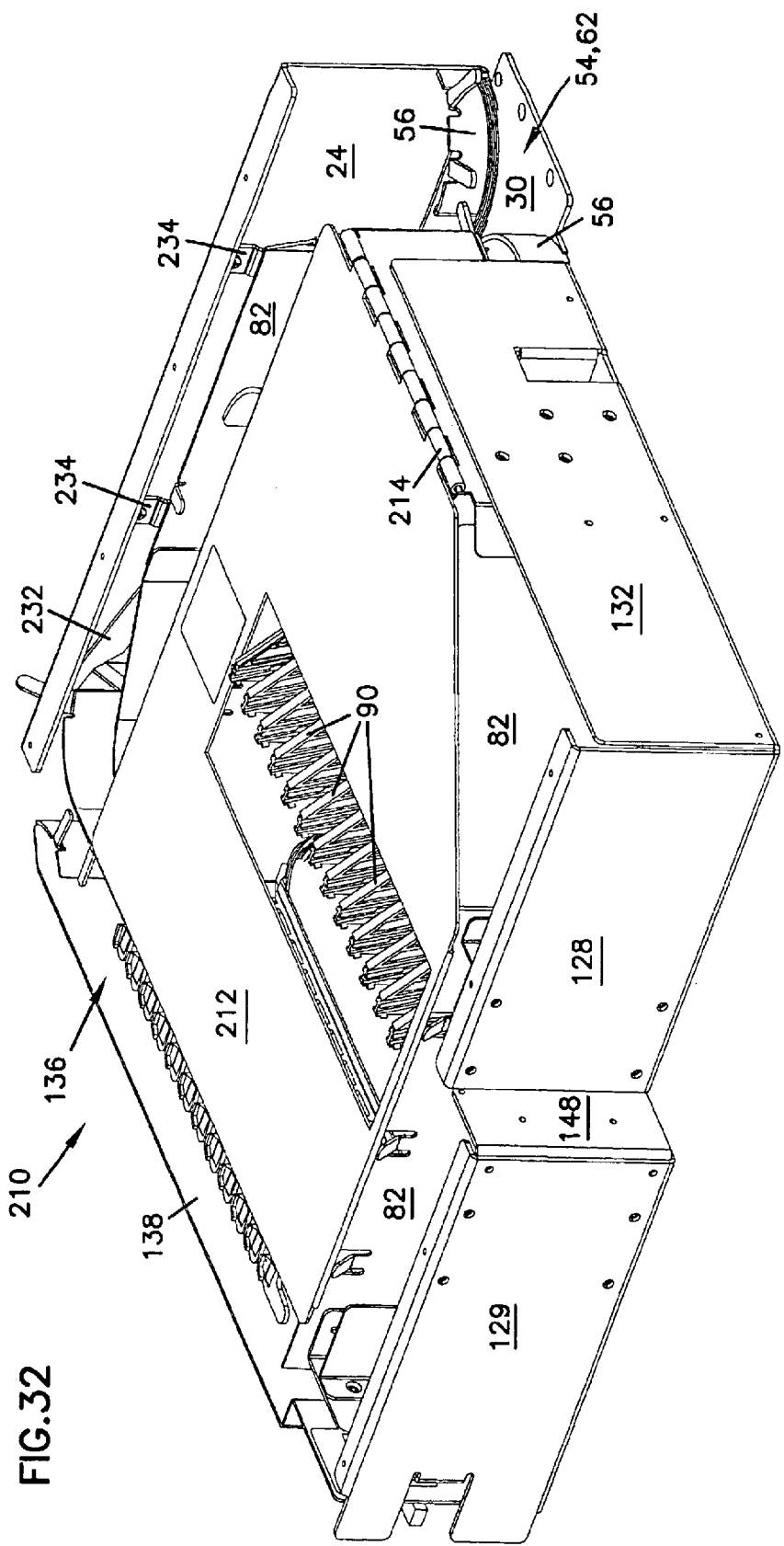
FIG. 32 is a rear perspective view of the termination panel of FIG. 23, with the top removed for clarity.
Figure 33:
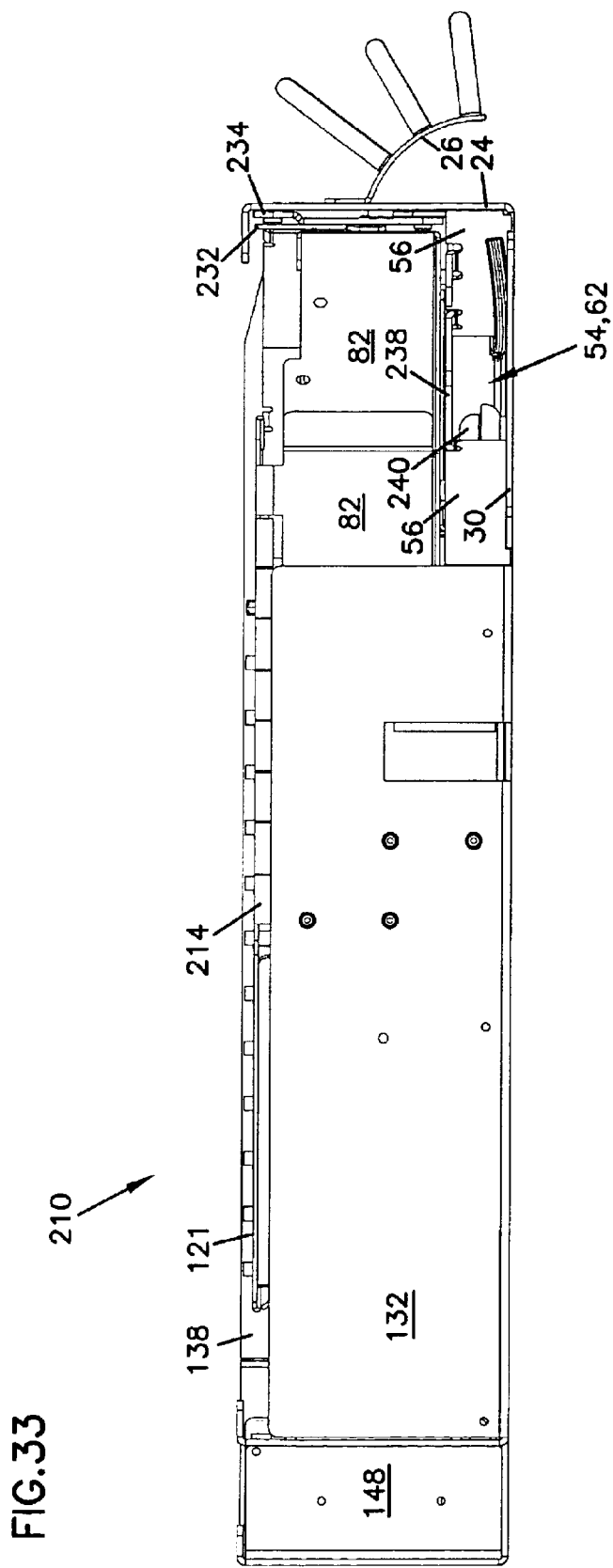
FIG. 33 is a rear view of the termination panel of FIG. 32.
Figure 34:
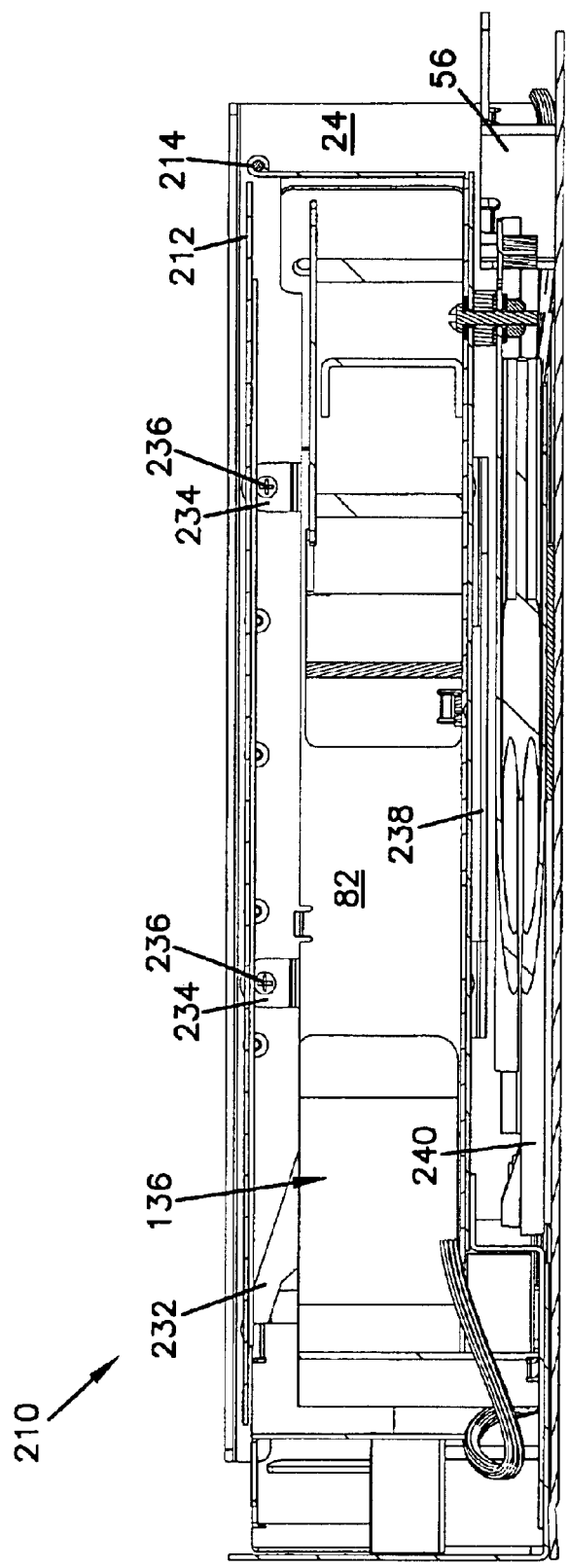
FIG. 34 is a side cross-sectional view of the termination panel of FIG. 33 taken along the middle of the cable path through the panel.

Referring now to FIGS. 32 to 34, panel 210 is shown with cover 131 removed to permit viewing of the interior of panel 210 as tray 136 is moved from the closed position (shown in FIGS. 32 to 34) and the open position (shown in the FIGS. below). A back wall 132 extends upward from the rear of bottom 30 and cooperates with rear wall 130 extending downward from top 131 (shown in the FIGS. above) to close off the back of panel 210. Along side 24 adjacent cable path 62 are an actuator 232 which extends between tray 136 and one of two swinging links 234. Links 234 and actuator 232 are positioned between side 24 and the bulkhead 82 immediately adjacent side 24. Each link 234 includes an upper end pivotably connected to side 24 by a fastener 236. Each link 234 includes a bottom end pivotably connected to a movable plate 238 which is positioned along and defines the top edge of cable path 62 beneath tray 136. When tray 136 is in the closed position as shown in FIGS. 32 to 34, cables are trapped between bottom 30 and the plate. In this manner, plate 238 prevents any cables within cable path 62 from contacting or possibly interfering with the movement of tray 136.

Shown in FIG. 34 is an extendable rotatable support 240 pivotably attached to bottom 30 adjacent cable path 62 and tray 136 underneath raised floor 60. As tray 136 is moved from the close position to the open position, support 240 rotates and extends out of front opening 32 to provide additional support to tray 136. Without support 240, only hinge 42 is supporting tray 136 and tray 136 may sag or otherwise bind hinge 42 (shown in FIG. 3, above) due to the weight of tray 136 and the components installed in tray 136. Support 240 provides additional support to tray 136 in the open position and aids in the movement of tray 136.

Figure 35:
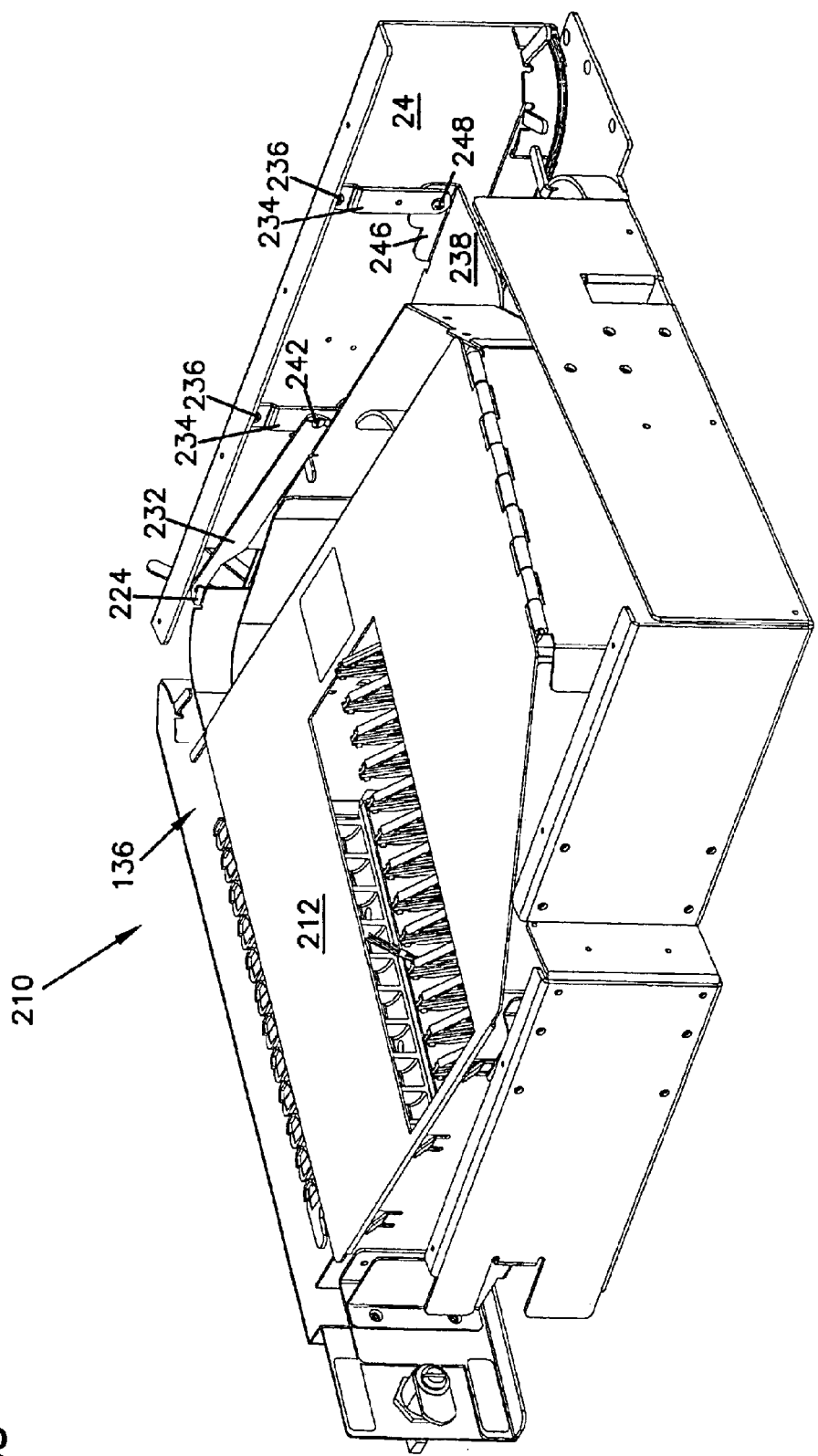
FIG. 35 is a rear perspective view of the termination panel of FIG. 23, with the tray moved approximately 15 degrees from the closed position toward the open position.
Figure 36:
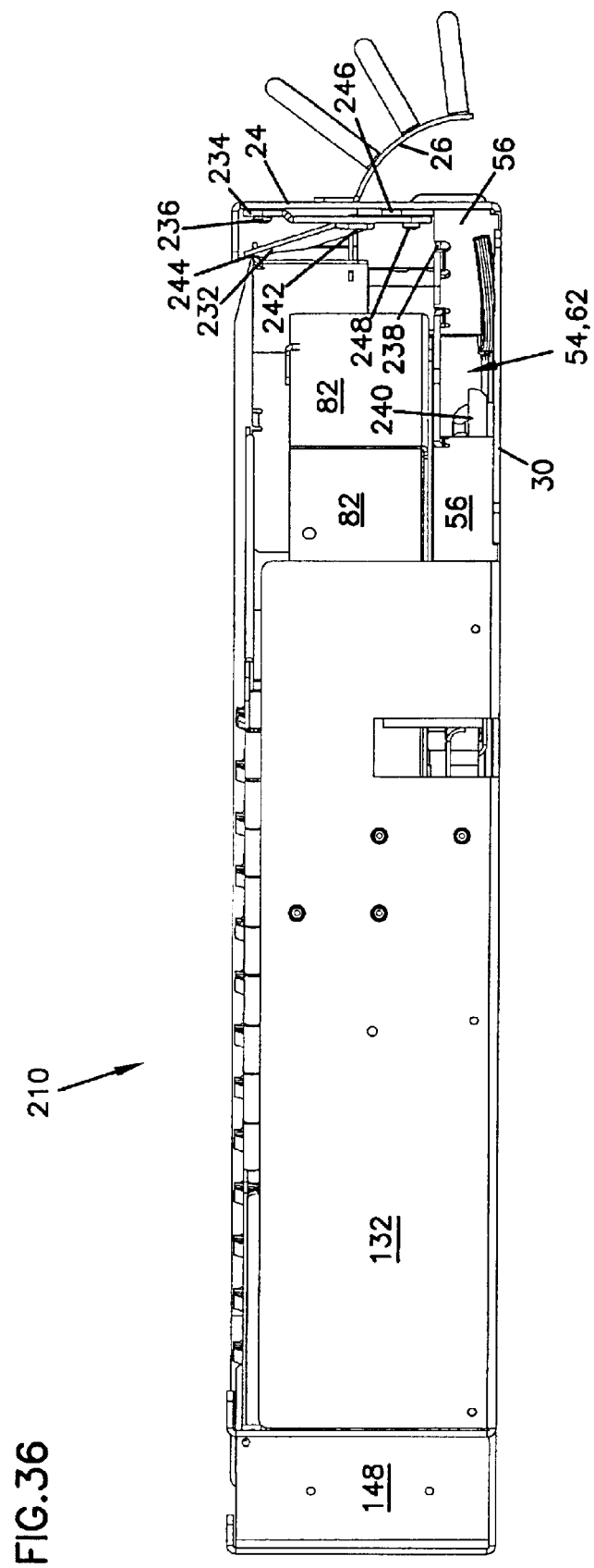
FIG. 36 is a rear view of the termination panel of FIG. 35.
Figure 37:
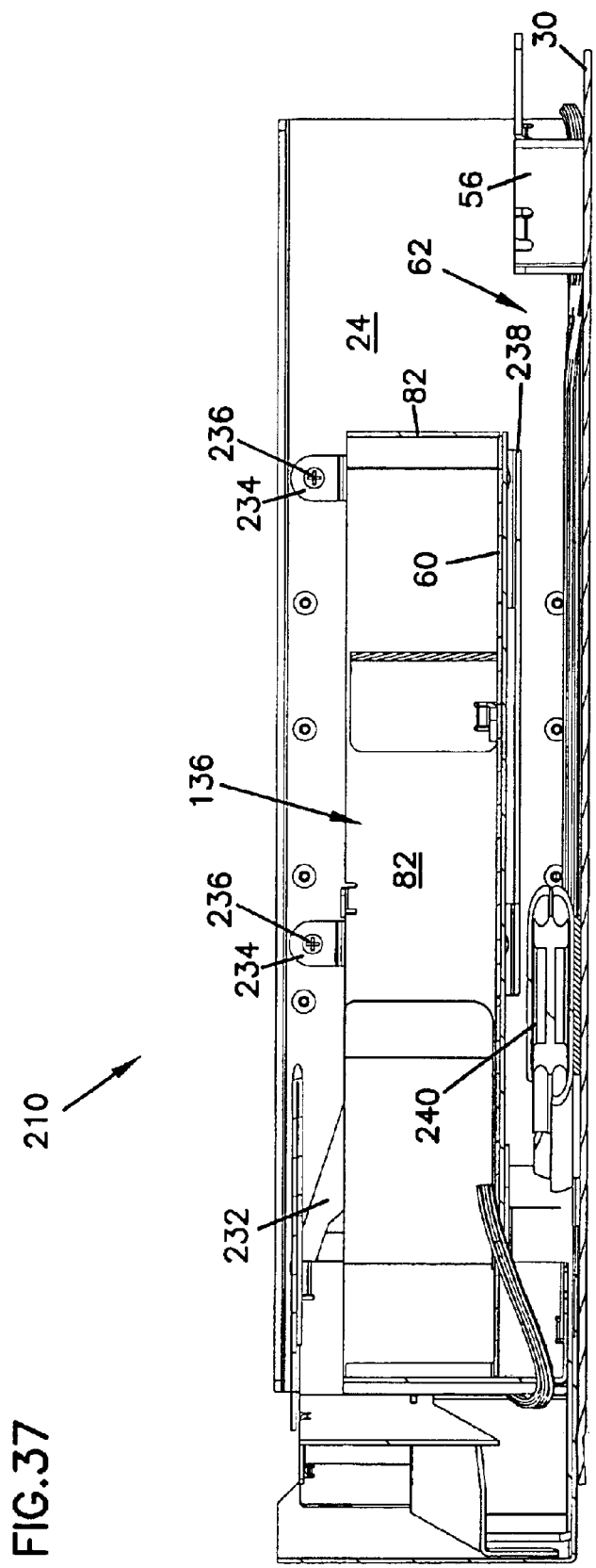
FIG. 37 is a side cross-sectional view of the termination panel of FIG. 35 taken along the middle of the cable path through the panel.

Referring now to FIGS. 35 to 37, tray 136 has been moved approximately 15 degrees from the closed position toward the open position. Actuator 232 is attached to tray 136 at an attachment point 244 permitting three-dimensional movement of actuator 232 relative to tray 136. As shown in FIG. 36, actuator 232 has been displaced from side 24 but has not significantly displaced link 234 to which is it attached. Actuator 232 is pivotably attached to the forwardmost link 234 at a attachment point 242 which also permit some articulation of link 232 are tray 136 is moved. Plate 238 extends essentially parallel to bottom 30 and includes a pair of tabs 246 extending upward adjacent side 24. Links 234 are pivotably attached to tabs 246 by fasteners 248.

Figure 38:
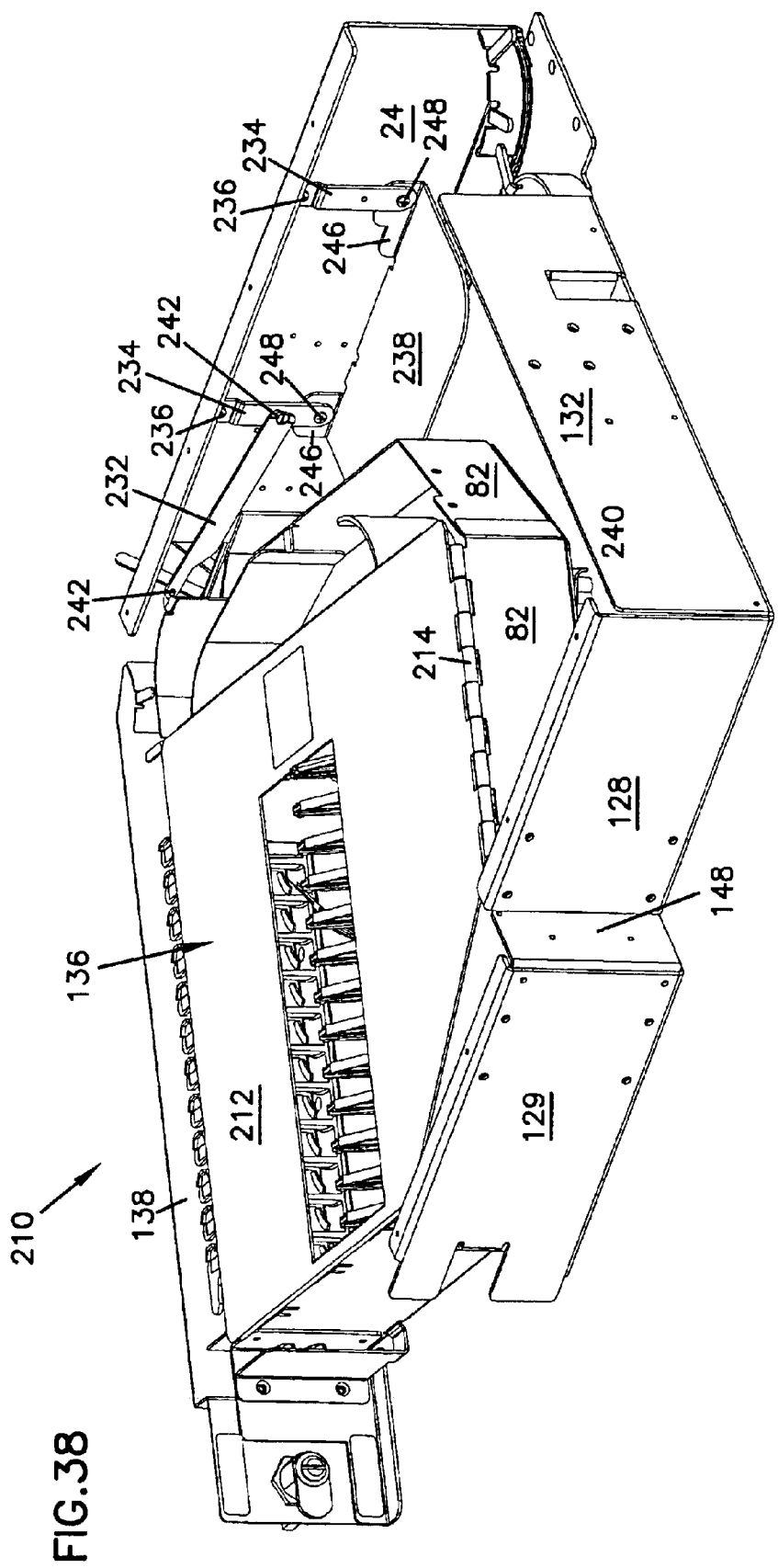
FIG. 38 is a rear perspective view of the termination panel of FIG. 23, with the tray moved approximately 30 degrees from the closed position toward the open position.
Figure 39:
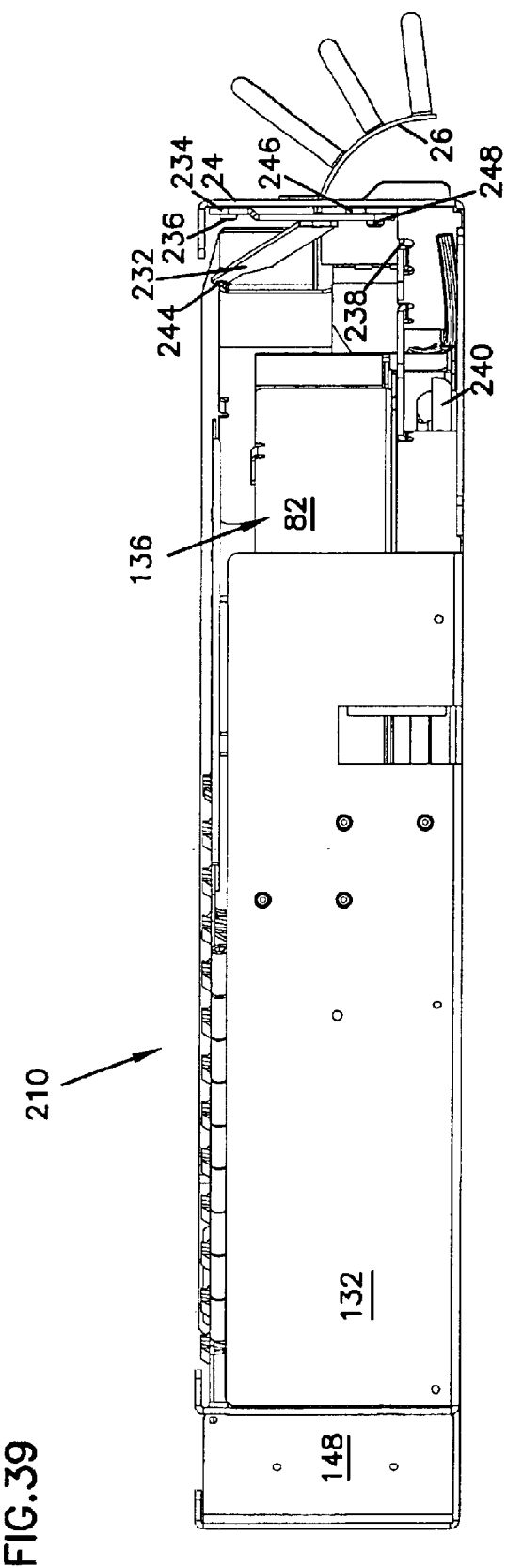
FIG. 39 is a rear view of the termination panel of FIG. 38.
Figure 40:
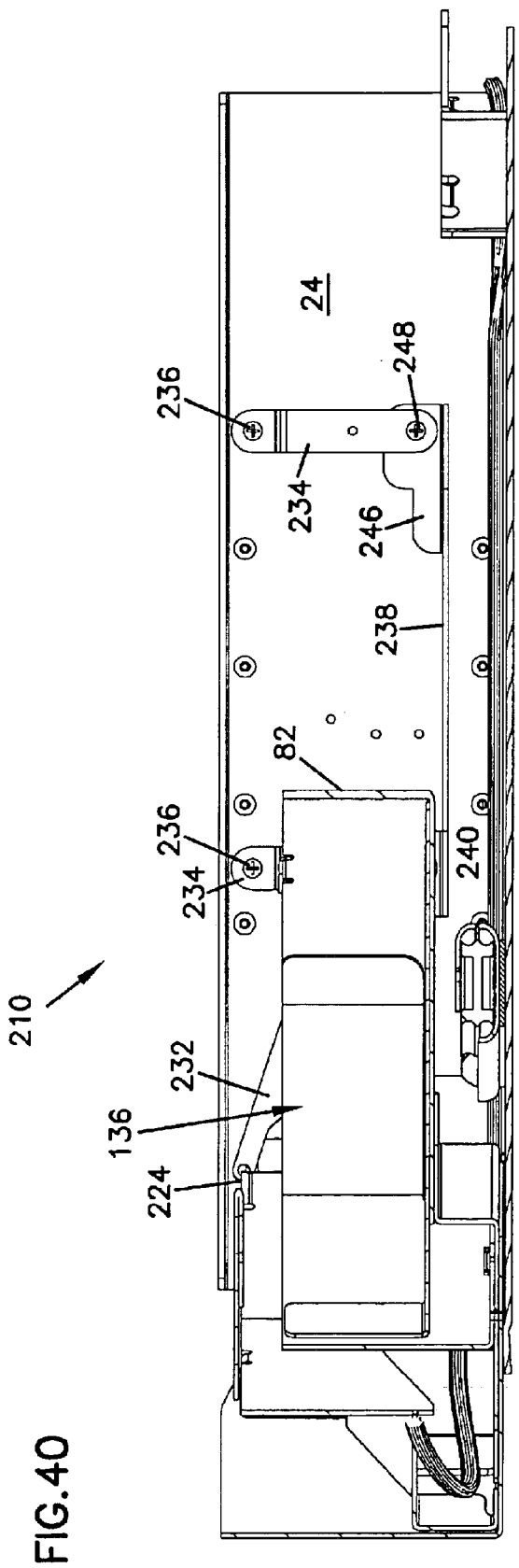
FIG. 40 is a side cross-sectional view of the termination panel of FIG. 38 taken along the middle of the cable path through the panel.

Referring now to FIGS. 38 to 40, tray 136 has been moved approximately 30 degrees from the closed position toward the open position. As shown in FIG. 40, actuator 232 has been further displaced from side 24 and has begun to pull link 234 to which it is attached toward the front of panel 210. As this link moves forward, it will begin to swing upward and draw plate 238 up from cable path 62. Note that this upward movement is not yet visible in FIGS. 38 to 40, although some forward displacement of links 234 has taken place.

Figure 41:
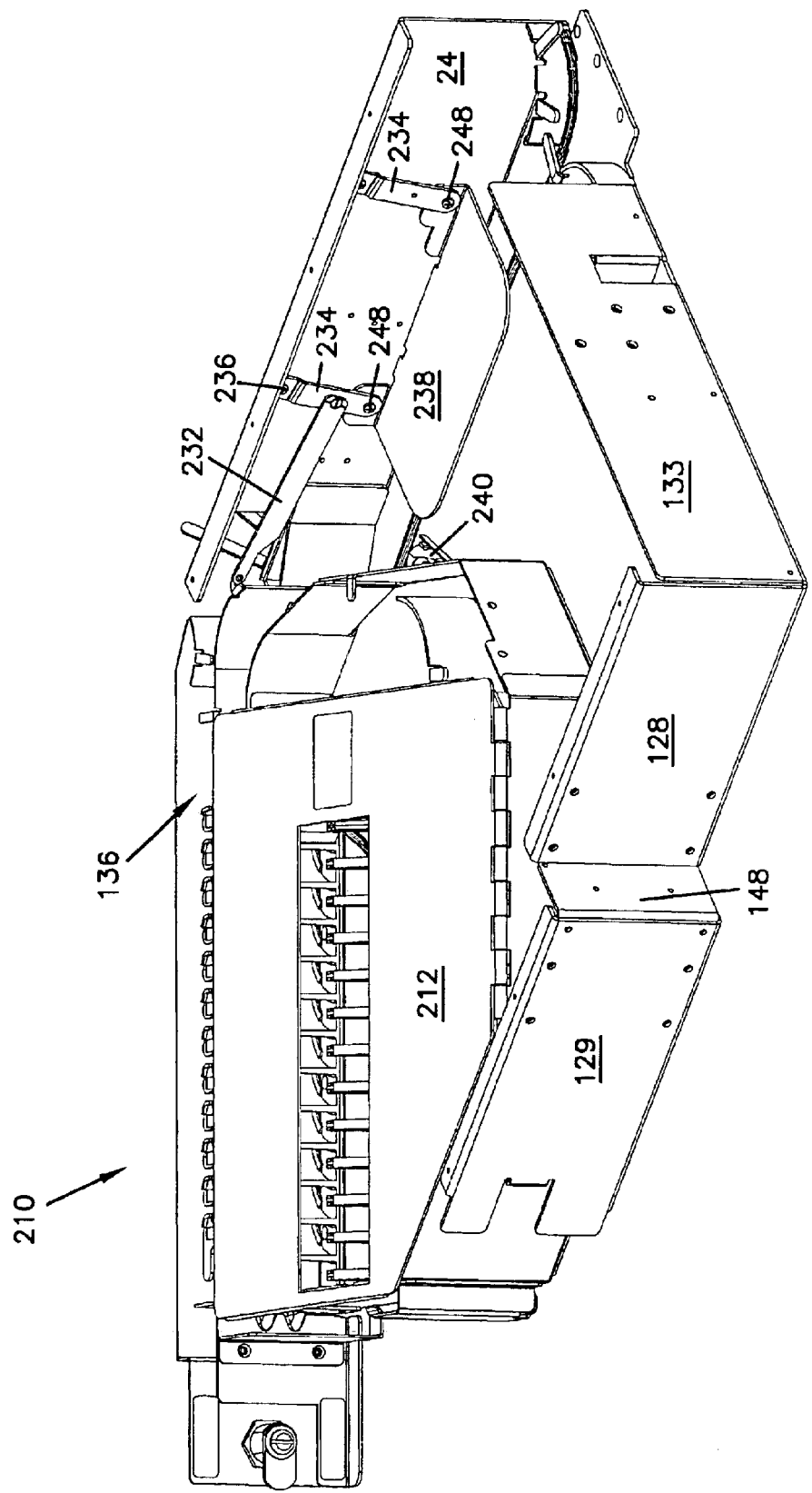
FIG. 41 is a rear perspective view of the termination panel of FIG. 23, with the tray moved approximately 45 degrees from the closed position toward the open position.
Figure 42:
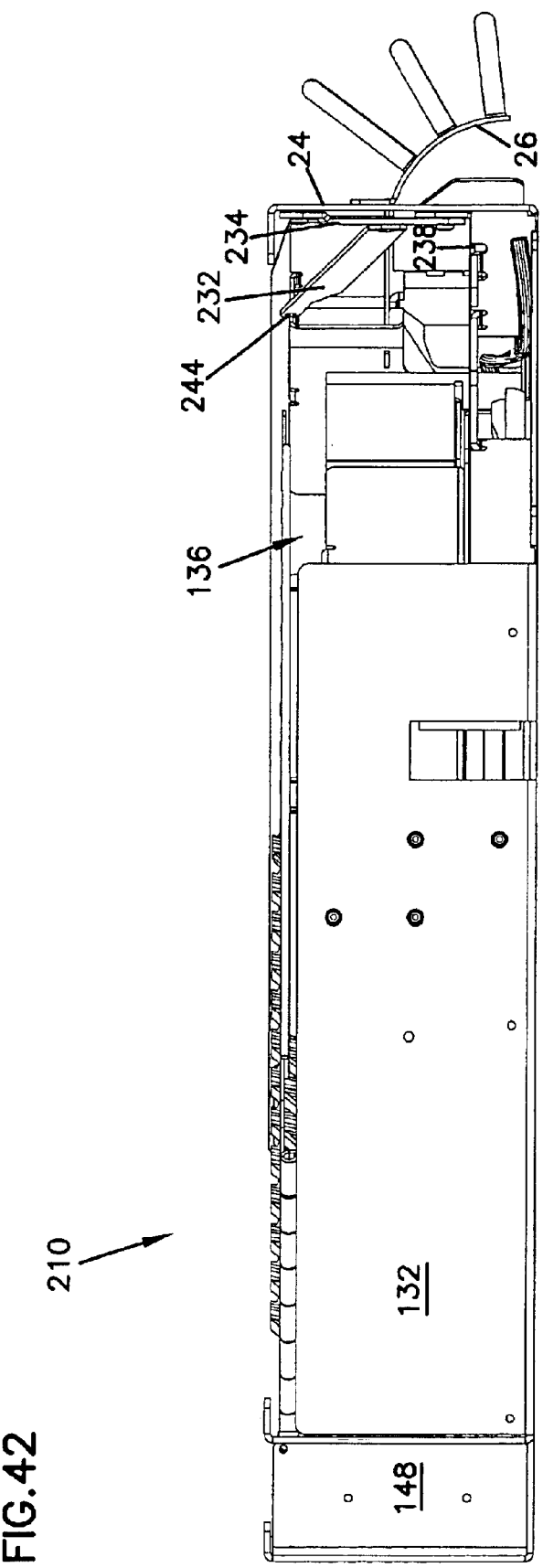
FIG. 42 is a rear view of the termination panel of FIG. 41.
Figure 43:
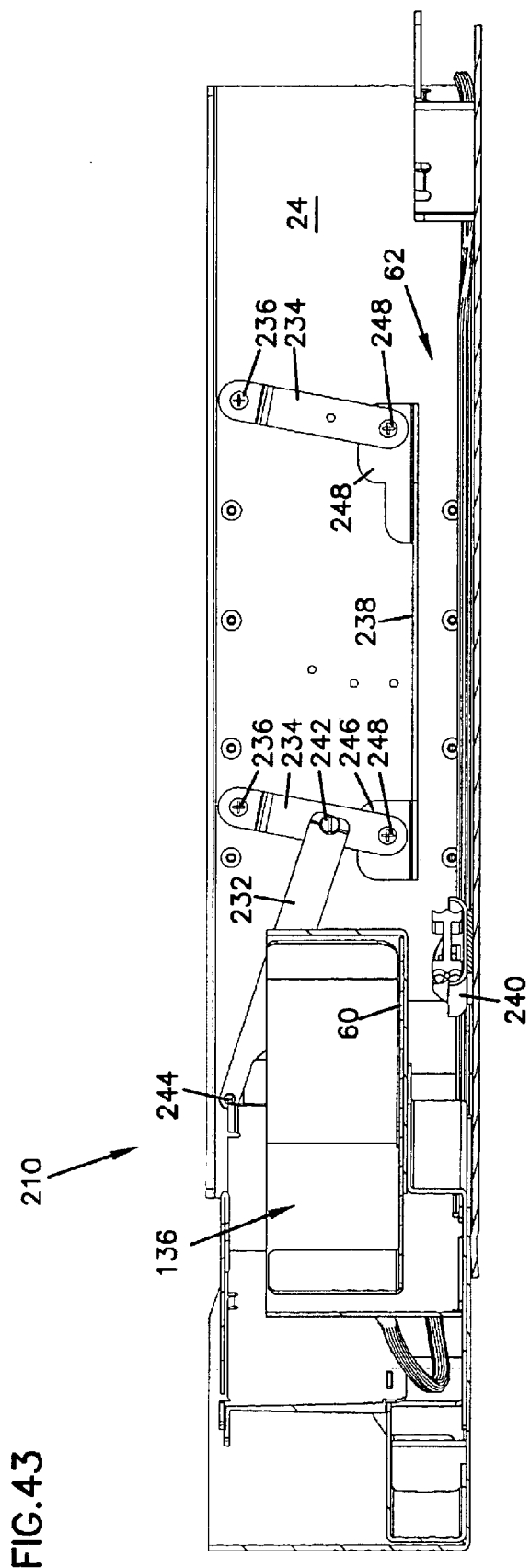
FIG. 43 is a side cross-sectional view of the termination panel of FIG. 41 taken along the middle of the cable path through the panel.

Referring now to FIGS. 41 to 43, tray 136 has been moved approximately halfway between the open and closed positions. As shown in FIGS. 42 and 43, plate 238 has begun to be vertically displaced away from bottom 30 above cable path 62 as actuator 232 is further displaced from side 24 and pulled forward by the movement of tray 136. Actuator 232 in turn pulls on forwardmost link 234 at attachment point 244 and pulls plate 238 and rearmost link 234 forward. This causes links 234 to pivot about fasteners 236 which in turn raises plate 238.

Figure 44:
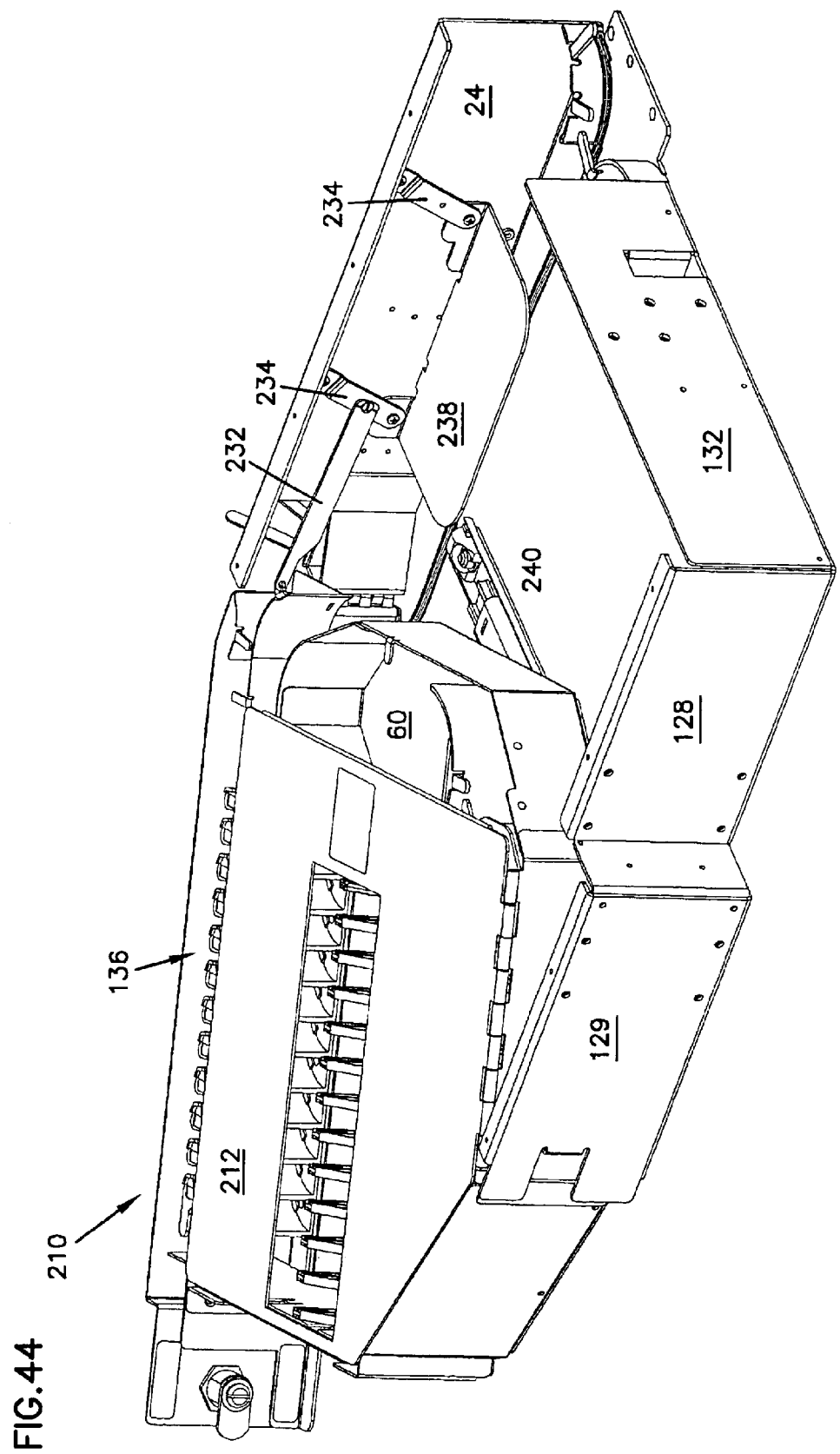
FIG. 44 is a rear perspective view of the termination panel of FIG. 23, with the tray moved approximately 60 degrees from the closed position toward the open position.
Figure 45:
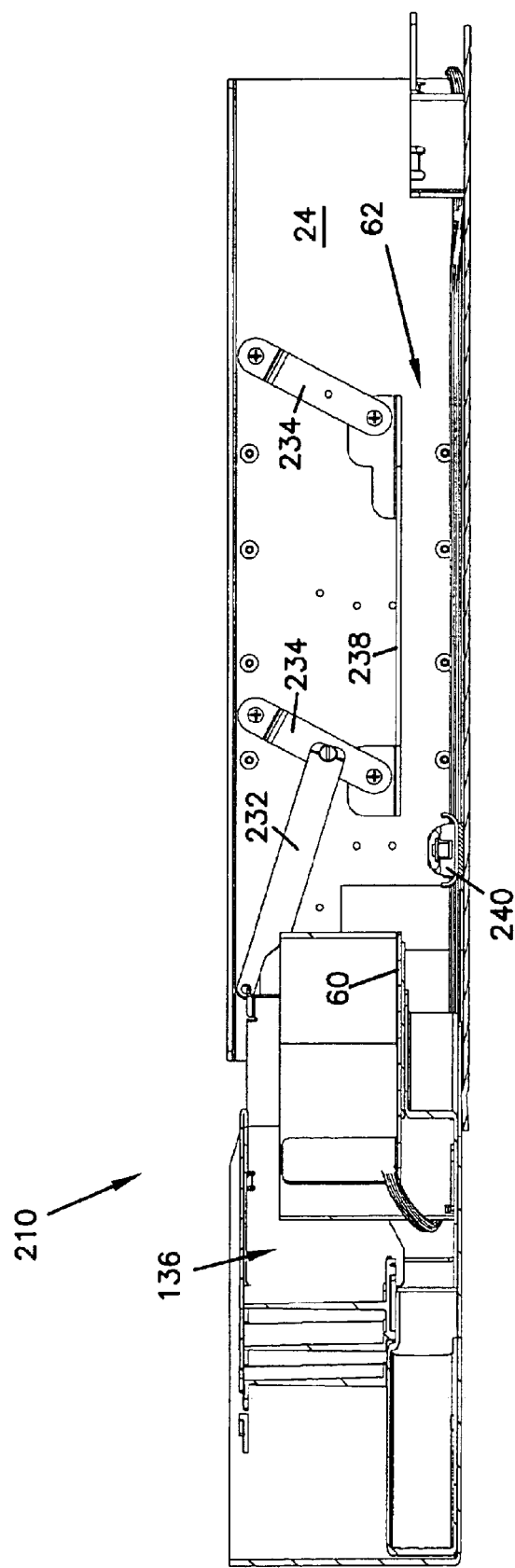
FIG. 45 is a rear view of the termination panel of FIG. 44.
Figure 46:
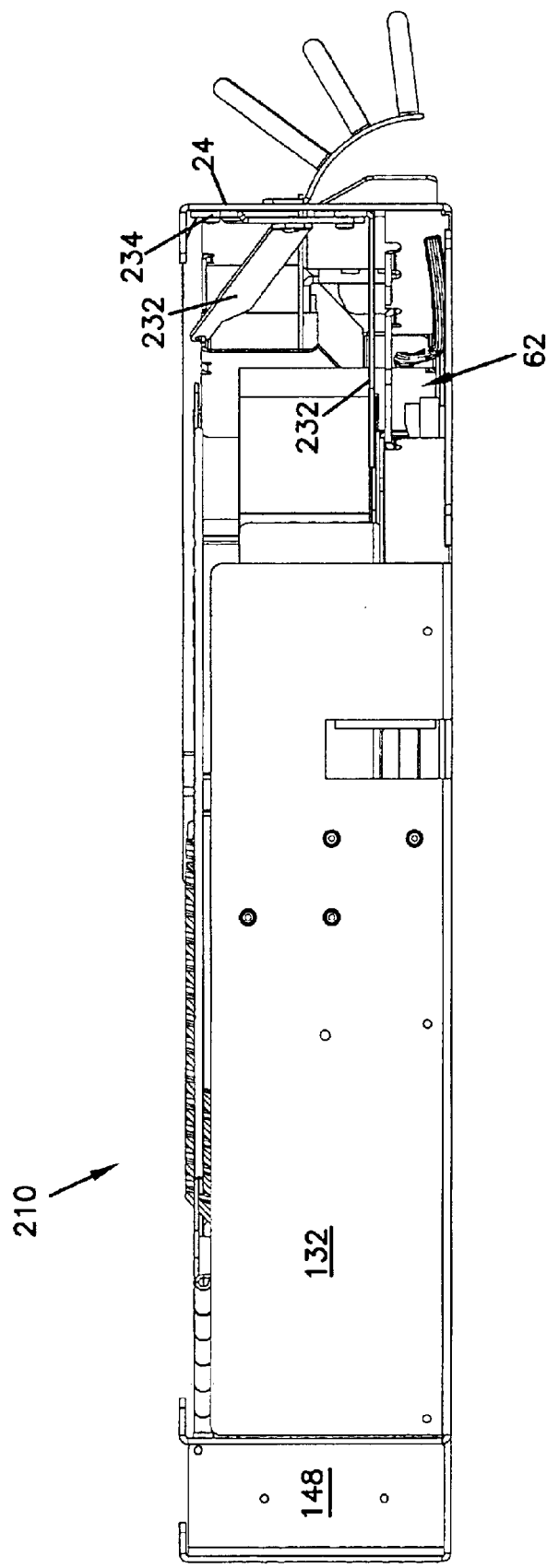
FIG. 46 is a side cross-sectional view of the termination panel of FIG. 44 taken along the middle of the cable path through the panel.

Referring now to FIGS. 44 to 46, tray 136 has now been moved to approximately 60 degrees from the closed position to the open position. Actuator 232 has further displaced links 234 forward. Links 234 have pivoted about fasteners 236 and drawn plate 238 further above cable path 62. Note that for the first time in the sequence illustrated by the FIGS. above, plate 238 has been displaced above the level of raised floor 60. As plate 238 moves higher, cables within cable path 62 are no longer held down to the level defined by raised floor portion 60 of tray 136. As plate 238 extends beneath raised floor 62 of tray 136, the timing of plate 238 being displaced away from bottom 30 by actuator 232 and links 234 is preferably set so that plate 238 does not interfere with or impact tray 136. While such interference may not be significant issue when moving tray 136 as shown from the closed position to the open position, such interference may prevent tray 136 from being moved from the open position to the closed position.

Figure 47:
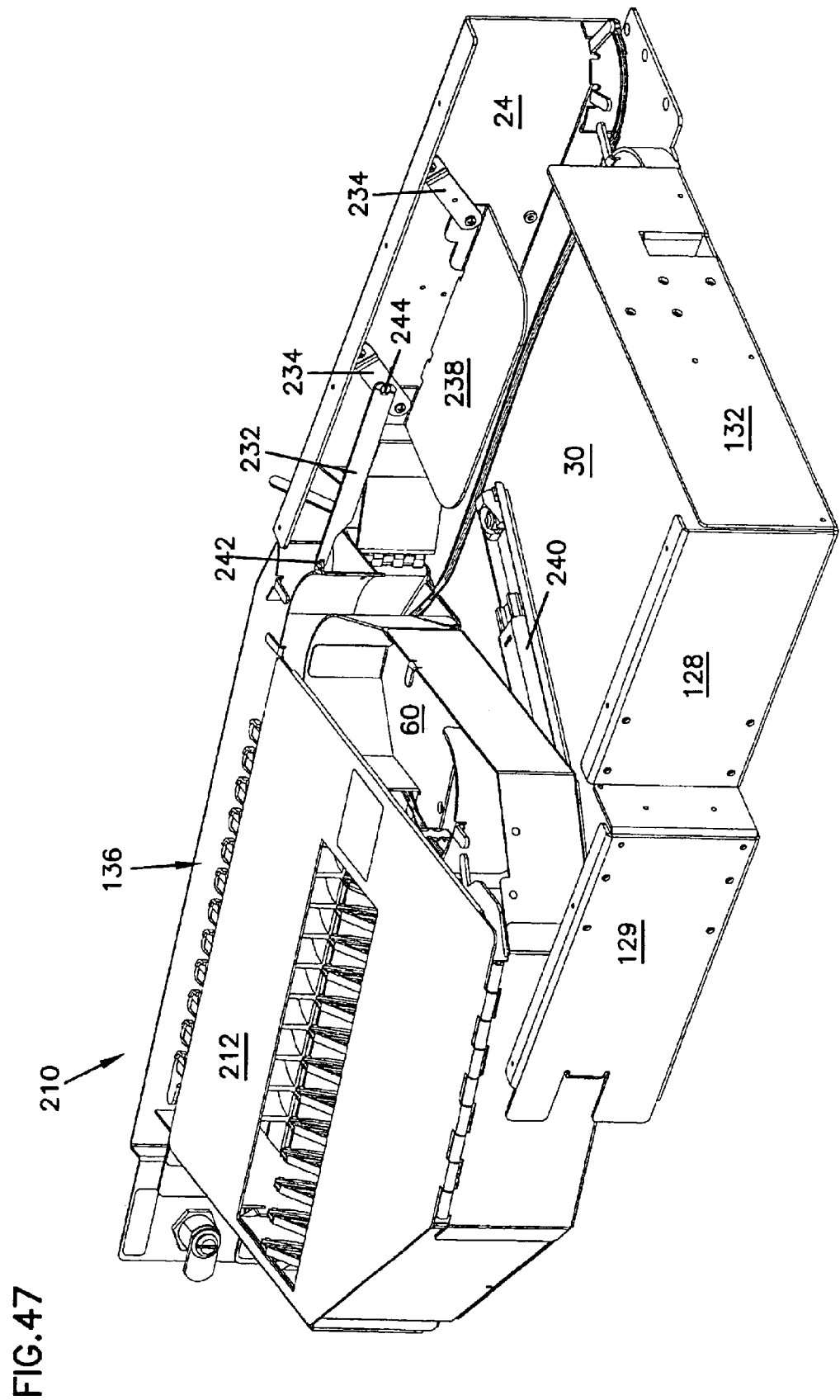
FIG. 47 is a rear perspective view of the termination panel of FIG. 23, with the tray moved approximately 75 degrees from the closed position toward the open position.
Figure 48:
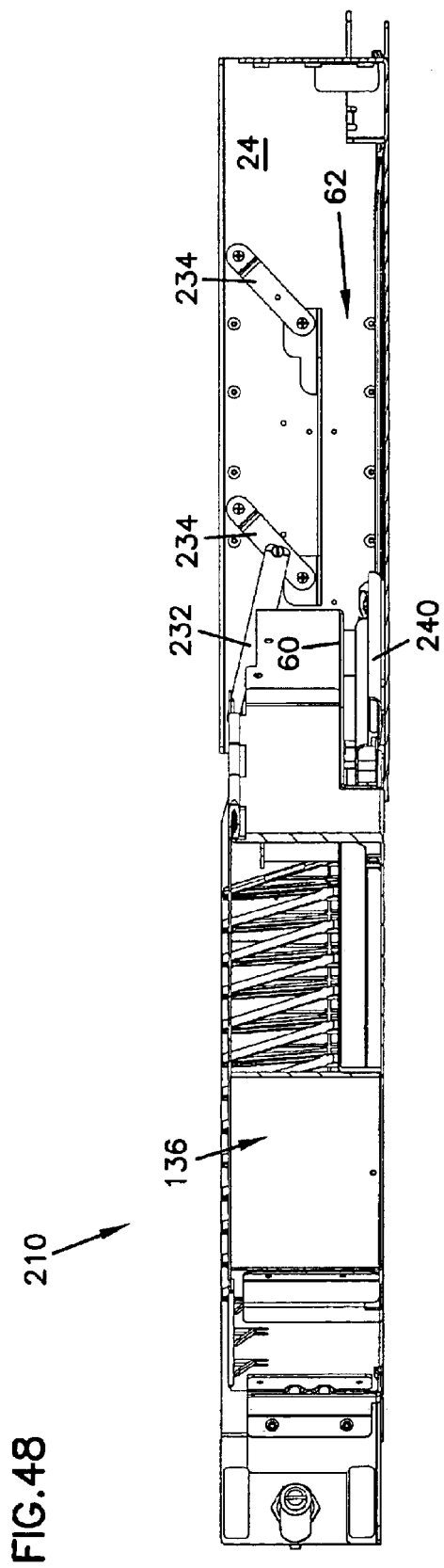
FIG. 48 is a rear view of the termination panel of FIG. 47.
Figure 49:
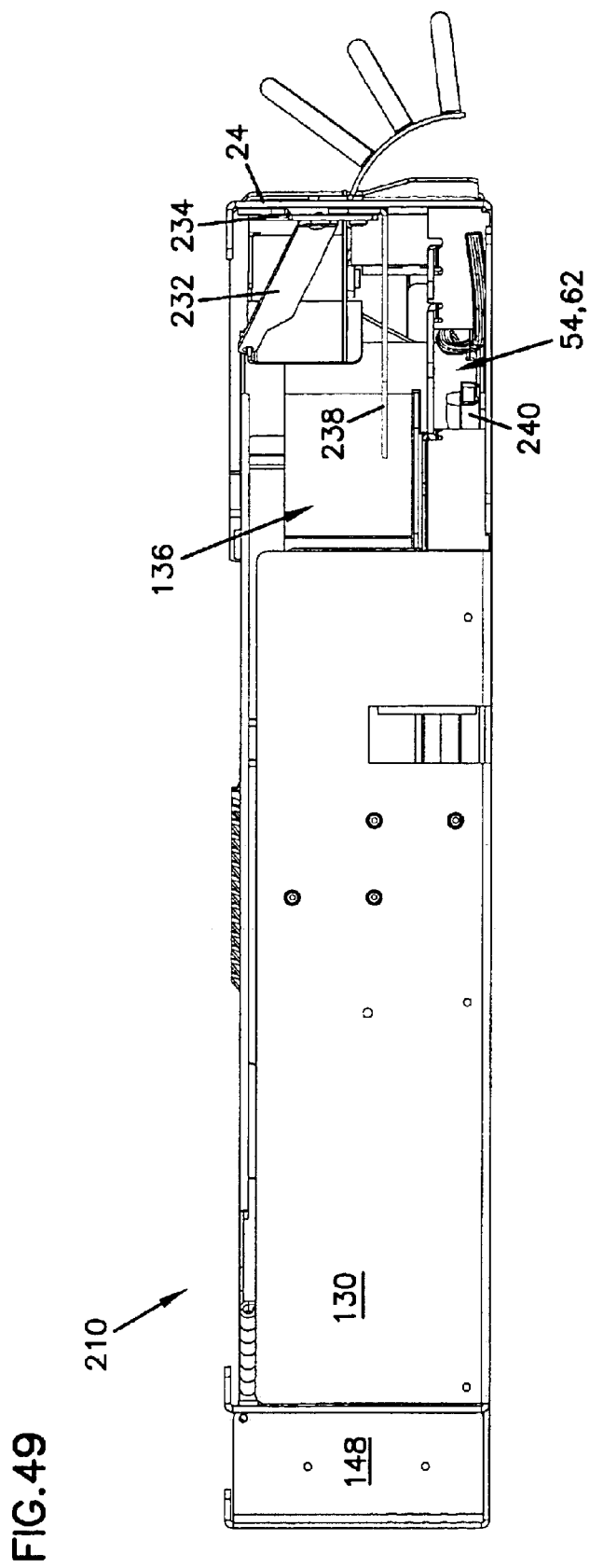
FIG. 49 is a side cross-sectional view of the termination panel of FIG. 47 taken along the middle of the cable path through the panel.

Referring now to FIGS. 47 to 49, tray 136 has now been moved to approximately 15 degrees from the open position. As raised floor portion 60 no longer overlays any portion of plate 238, further displacement of plate 238 from bottom 30 is desirable to open up access to cable path 62.

Figure 50:
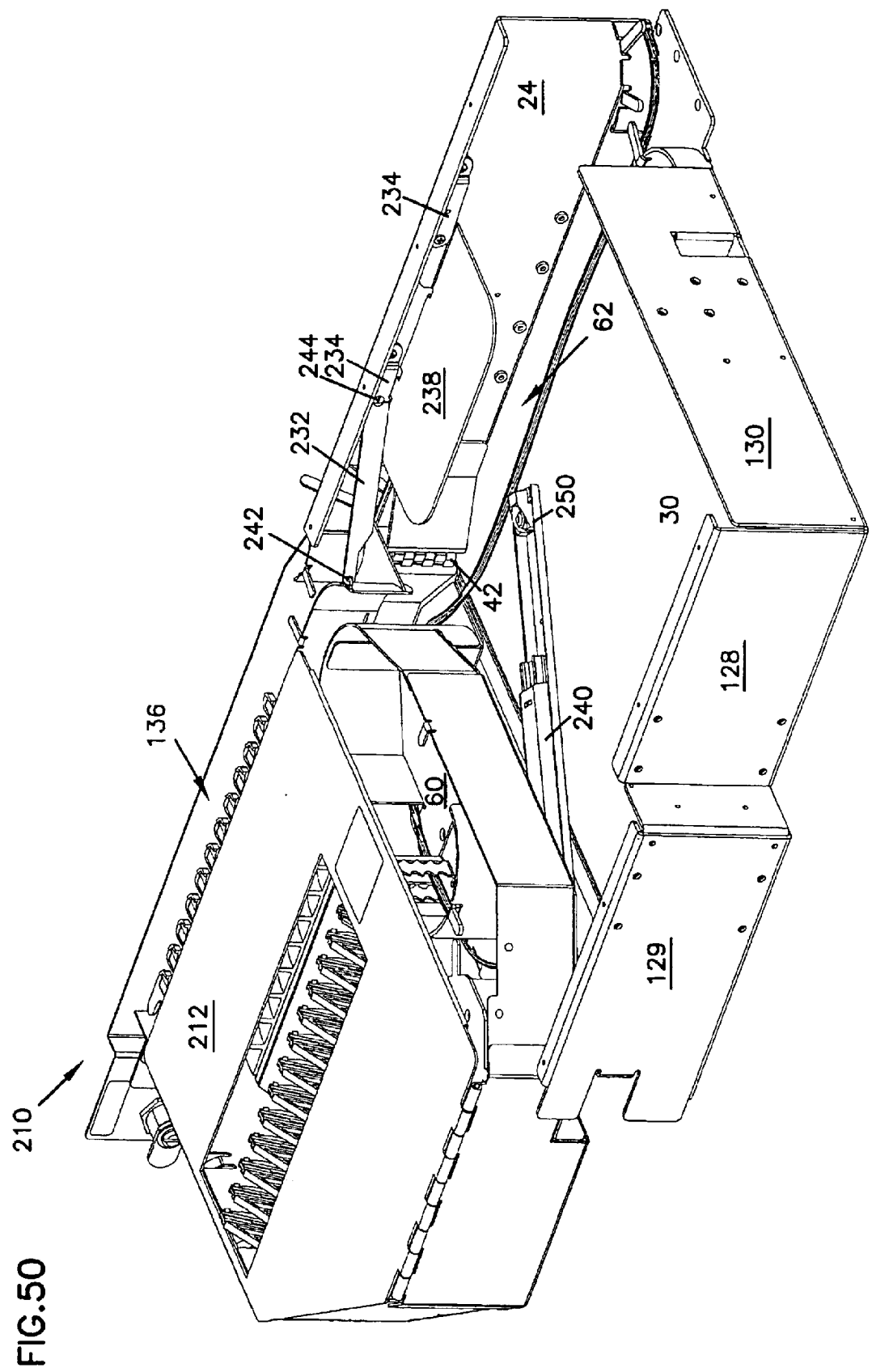
FIG. 50 is a rear perspective view of the termination panel of FIG. 23, with the tray in the open position.
Figure 51:
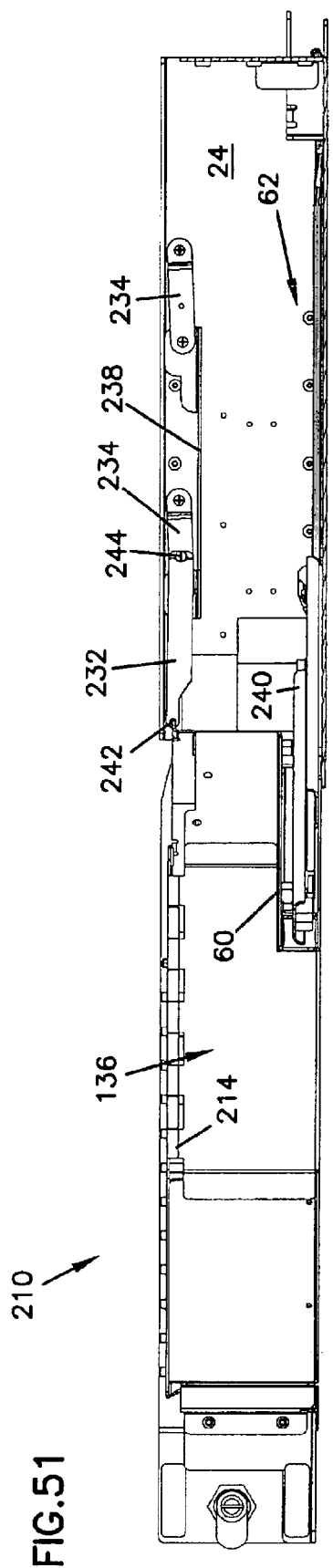
FIG. 51 is a rear view of the termination panel of FIG. 50.
Figure 52:
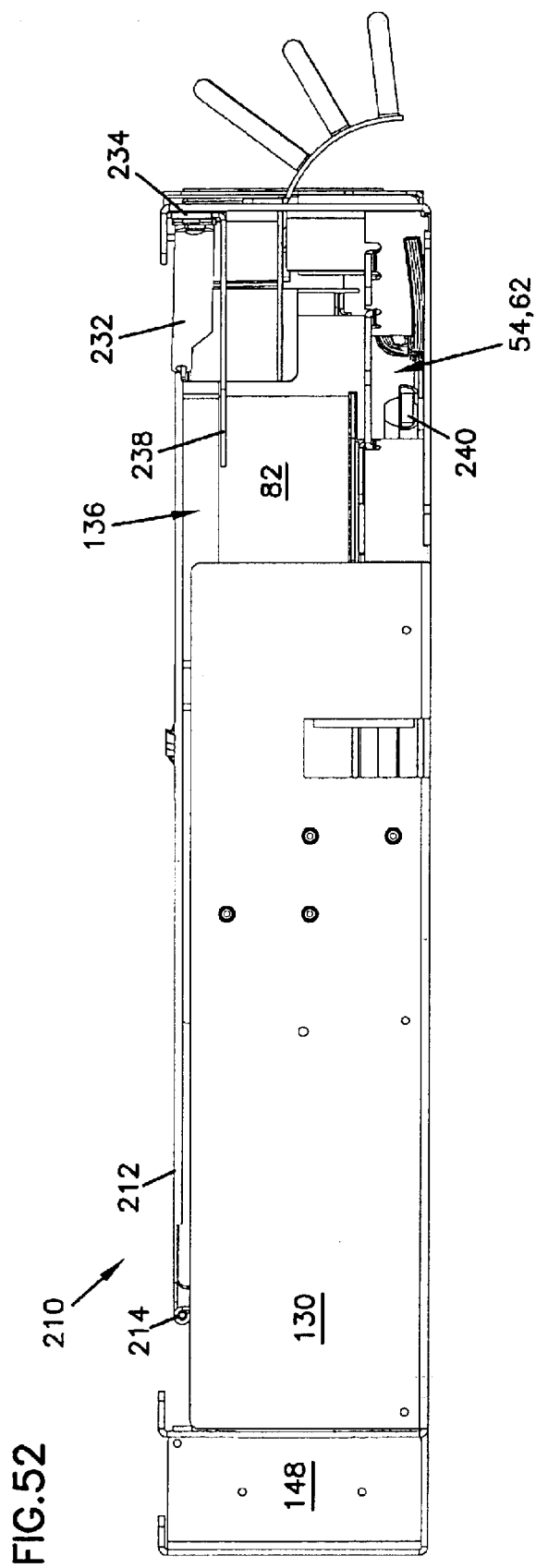
FIG. 52 is a side cross-sectional view of the termination panel of FIG. 50 taken along the middle of the cable path through the panel.

Referring now to FIGS. 50 to 52, tray 136 is now in the open position, rotated approximately 90 degrees from the closed position about hinge 42. Support 240 has rotated from a position approximately parallel to cable path 62 through more than 90 degrees about a pivot point 250 in bottom 30 and now extends underneath raised floor 60 out of front opening 32. Plate 238 is now at a point of maximum displacement from bottom 30 to provide unobstructed access to cable path 62. In the open position, cable path 62 is at it most accessible state to aid the routing of cables through rear opening 54 into tray 136. In the closed position, as illustrated in FIGS. 32 to 34, above, plate 238 defines the upper limit of cable path 62 beneath raised floor 60 of tray 136. As plate 238 moves from the open position to the closed position, plate 238 presses down any cables within cable path 62 to ensure that tray 136 does not pinch any cables or trap any cables against side 24. Such pinching or trapping may result in temporary or permanent obstruction of the optical path within the cable and degrade to cable's ability to transmit optical signals.

Alternative configurations of links 234 are anticipated and may include an attachment point 244 for actuator 232 positioned above fastener 236 pivotably connecting link 234 to side 24. Relative placement of the pivotable attachment of links 234 to side 24 and plate 238 with regard to the position of attachment point 244 may be varied to alter the extent of vertical and horizontal displacement of plate 238 and the timing of the displacement relative to the movement of tray 136.

The various embodiment described above refer to optical fiber cables. It is understood that a telecommunications termination panel according to the present invention may be configured for copper cables or other similar cables.

The above specification, examples and data provide a complete description of the manufacture and use of the invention. Since many embodiments of the invention can be made without departing from the spirit and scope of the invention, the invention resides in the claims hereinafter appended.

What is claimed is as follows:

1. A telecommunications termination panel comprising:
   a housing including a top, a bottom, a first side and a second opposing side defining a front opening and a rear opening;
   a tray pivotably mounted within the front opening of the housing, pivoting about a vertical axis located adjacent the first side and including a cable entry adjacent the axis of pivot and a plurality of connection locations, the tray movable between an open position and a closed position;
   the rear opening adjacent the first side;
   a cable path defined along the bottom of the housing, along the first side between the cable entry of the tray and the rear opening;
   a movable plate above the cable path, the plate movable between a first lowered position when the tray is closed and a second raised position when the tray is open, and the movement of the plate between the first and second positions is actuated by the movement of the tray between the closed and open positions; and,
   wherein the movable plate in the first position defines an upper limit to the cable path beneath the tray and the movable plate in the second position is raised above the cable path to permit placement of cables within the cable path.

2. The telecommunications termination panel of claim 1, wherein the movable plate is approximately parallel to the bottom in the first position.

3. The telecommunications termination panel of claim 1, wherein the movable plate is approximately parallel to the bottom in the second position.

4. The telecommunications termination panel of claim 1, wherein a portion of the tray adjacent the cable path when the tray is in the closed position is raised above and positioned over the movable plate.

5. The telecommunications termination panel of claim 1, wherein the movable plate is mounted to the first side by a pair of swinging links and an actuator arm extends from the tray to move the movable plate between the first and second positions.

6. The telecommunications termination panel of claim 1, wherein a support slide is positioned between the tray and the bottom of the housing, the support slide rotatable connected to the tray and the bottom and extendable from a collapsed position adjacent to the cable path when the tray is in the closed position, to an extended position extending out the front opening when the tray is in the open position.

7. The telecommunications termination panel of claim 1, wherein the tray includes a wall extending from the tray adjacent the second side when the tray is in the closed position, the wall includes a mount to receive information cards such that the information cards are within the housing when the tray is in the closed position and are accessible to a user when the tray is in the open position.

8. The telecommunications termination panel of claim 5, wherein each of the swinging links includes a pivotable attachment to the movable plate and a pivotable attachment to the first side.

9. The telecommunications termination panel of claim 6, wherein the support slide is generally parallel to the cable path when the tray is in the closed position.

10. The telecommunications termination panel of claim 7, wherein the information cards may include one of instruction cards, warning labels, routing information cards and designation strips related to the telecommunications cables attached to the connection locations.

11. The telecommunications termination panel of claim 8, wherein the actuator arm is connected to at least one of the swinging links.

12. The telecommunications termination panel of claim 10, wherein the wall includes a portion adjacent the second side when the tray is in the closed position, the portion of the wall includes a mount to receive information cards such that the information cards are within the housing when the tray is in the closed position and are accessible to a user when the tray is in the open position.

13. The telecommunications termination panel of claim 12, wherein the information cards may include one of instruction cards, warning labels, routing information cards and designation strips related to the telecommunications cables attached to the connection locations.

14. A telecommunications termination panel comprising:
   a housing including a top, a bottom, a first side and a second opposing side defining a front opening;
   a tray pivotably mounted within the front opening of the housing, pivoting about a vertical axis located adjacent the first side and including a cable entry adjacent the axis of pivot and a plurality of connection locations, the tray movable between an open position and a closed position;
   the tray including perimeter, a wall extending upward adjacent the perimeter to enclose the plurality of connector locations, a first portion of the wall closing the front opening when the tray is in the closed position, and a cover hingedly mounted to a second portion of the wall opposite the first portion;
   the cover movable between an access position and an operational position when the tray is in the open position, only the operational position of the cover allowing the tray to move from the open position to the closed position, the access position allowing access to the connection locations and to cables extending to or away from the connection locations, and the cover in the access position preventing the tray from moving from the open to the closed position.

15. The telecommunications termination panel of claim 14, wherein the connection locations include adapters to connect optical fiber cables, the adapters mounted in one of a plurality of modules mounted to the tray with each module moveably mounted along a line of travel above the tray, each one of the modules including a plurality of adapters for holding a fiber optic connector, each adapter having opposite ends for coupling to a fiber optic connector, each one of the adapters movable with one of the modules along the line of travel, and further wherein the cover may not be moved to the operational position when any module is extending upward along the line of travel.

16. The telecommunications termination panel of claim 15, wherein the plurality of adapters are oriented to connect a first optical fiber extending to the rear of each adapter to a second optical fiber extending to the front of each adapter when the tray is in the closed position.

17. The telecommunications termination panel of claim 15, wherein the cover includes an opening directly above the modules holding the adapters permitting visibility of the modules and adapters when the cover is in the operational position and the tray is in the open position.

18. The telecommunications termination panel of claim 16, wherein the tray further includes a first series of cable management structures for routing optical fiber cables to the rear of the adapters with bend radius protection and the cover prevents access to the first series of cable management structures in the operational position.

19. The telecommunications termination panel of claim 16, wherein the tray further includes a second series of cable management structures for routing optical fiber cables from the front of the adapters away from the modules toward the axis of pivot with bend radius protection and the cover prevents access to the second series of cable management structures in the operational position.

20. The telecommunications termination panel of claim 17, wherein the cover includes areas for receiving indicia relating to the optical fiber cables connected to the adapters.

21. The telecommunications termination panel of claim 17, wherein the opening in the cover is positioned to avoid contact with optical fiber cables extending from the adapters on any module extended along the line of travel when the cover is moved from the access position toward the operational position while allowing the cover to contact the module and prevent the movement of the cover to the operational position.

22. A telecommunications device comprising:

a first component that defines a cable path;

a second component to which cables positioned along the cable path are routed, the second component being moveable between a first position where the second component is within the first component and a second position where the second component is outside the first component; and a cable keeper positioned adjacent to the cable path, the cable keeper being operatively coupled to the second component such that the cable keeper moves toward a cable confining position when the second component is moved toward the first position, and moves toward a cable access position when the second component is moved toward the second position.

* * * * *

UNITED STATES PATENT AND TRADEMARK OFFICE
CERTIFICATE OF CORRECTION

PATENT NO. : 6,870,734 B2
DATED : March 22, 2005
INVENTOR(S) : Mertesdorf et al.

It is certified that error appears in the above-identified patent and that said Letters Patent is hereby corrected as shown below:

<u>Title page,</u>
Item [56], References Cited, U.S. PATENT DOCUMENTS, insert
-- 2002/0125800 A1 9/2002 Knudsen et al. -- in appropriate order.

Signed and Sealed this

Sixteenth Day of August, 2005

JON W. DUDAS
*Director of the United States Patent and Trademark Office*